(12) United States Patent
Spitzer

(10) Patent No.: US 10,054,797 B2
(45) Date of Patent: Aug. 21, 2018

(54) COMBINING A HIGH RESOLUTION NARROW FIELD DISPLAY AND A MID RESOLUTION WIDE FIELD DISPLAY

(71) Applicant: Google Inc., Mountain View, CA (US)

(72) Inventor: Mark Bradley Spitzer, Sharon, MA (US)

(73) Assignee: Google LLC, Mountain View, CA (US)

( * ) Notice: Subject to any disclaimer, the term of this patent is extended or adjusted under 35 U.S.C. 154(b) by 208 days.

(21) Appl. No.: 15/043,005

(22) Filed: Feb. 12, 2016

(65) Prior Publication Data

US 2016/0240013 A1    Aug. 18, 2016

Related U.S. Application Data

(60) Provisional application No. 62/115,455, filed on Feb. 12, 2015.

(51) Int. Cl.
*G02B 27/01* (2006.01)
*G02B 6/00* (2006.01)
(Continued)

(52) U.S. Cl.
CPC ........... *G02B 27/0179* (2013.01); *G02B 6/00* (2013.01); *G02B 27/0172* (2013.01); *G06F 1/163* (2013.01); *G06F 3/013* (2013.01); *G02B 2027/0118* (2013.01); *G02B 2027/0147* (2013.01); *G02B 2027/0187* (2013.01)

(58) Field of Classification Search
CPC ..... G02B 27/017–27/1079; G02B 6/00; G02B 2027/0118; G02B 2027/0147; G02B 2027/0187; G06F 3/013; G06F 3/011; G06F 1/163

See application file for complete search history.

(56) References Cited

U.S. PATENT DOCUMENTS

| 5,317,436 A | * | 5/1994 | Spitzer | A61B 3/113 257/E27.111 |
| 5,808,589 A | * | 9/1998 | Fergason | G02B 27/0172 345/8 |

(Continued)

FOREIGN PATENT DOCUMENTS

| JP | 2012-048263 A | 3/2012 |
| WO | 2016/130941 A1 | 8/2016 |

OTHER PUBLICATIONS

International Search Report and Written Opinion for PCT Patent Application No. PCT/US2016/017785, dated Jun. 3, 2016, 12 pages.

(Continued)

*Primary Examiner* — Larry Lee
(74) *Attorney, Agent, or Firm* — Brake Hughes Bellermann LLP

(57) ABSTRACT

A head mounted display (HMD) includes a first display portion included in the HMD, the first display portion having a first pixel density, a second display portion included in the HMD, the second display portion having the first pixel density, a third display portion attached to the HMD, the third display portion having a second pixel density, and at least one image combiner configured to combine two images by reflecting an image projected by the first display portion and the second display portion and allowing an image projected by the third display portion to pass through the at least one image combiner.

19 Claims, 24 Drawing Sheets

(51) Int. Cl.
*G06F 3/01* (2006.01)
*G06F 1/16* (2006.01)

(56) References Cited

U.S. PATENT DOCUMENTS

| | | | |
|---|---|---|---|
| 6,140,980 | A | 10/2000 | Spitzer et al. |
| 6,222,675 | B1 * | 4/2001 | Mall .................... G02B 27/017 345/7 |
| 6,529,331 | B2 | 3/2003 | Massof et al. |
| 6,636,185 | B1 | 10/2003 | Jacobsen et al. |
| 7,495,638 | B2 | 2/2009 | Lamvik et al. |
| 7,667,783 | B2 | 2/2010 | Hong et al. |
| 2004/0227703 | A1 * | 11/2004 | Lamvik .............. G02B 27/0172 345/76 |
| 2005/0013005 | A1 | 1/2005 | Rogers |
| 2010/0149073 | A1 * | 6/2010 | Chaum .............. G02B 27/0093 345/8 |
| 2010/0245387 | A1 | 9/2010 | Bachelder et al. |
| 2011/0063194 | A1 * | 3/2011 | Nakazawa ........... G02B 26/101 345/8 |
| 2012/0068913 | A1 | 3/2012 | Bar-Zeev et al. |
| 2017/0132757 | A1 * | 5/2017 | Thiebaud .............. G06T 3/4023 |

OTHER PUBLICATIONS

Ivan E. Sutherland, "A head-mounted three dimensional display"; The University of Utah; Reprinted with permission from Proceedings of the AFIPS Fall Joint Computer Conference, Washington, D.C.: Thompson Books, 1968; pp. 295-302.

\* cited by examiner

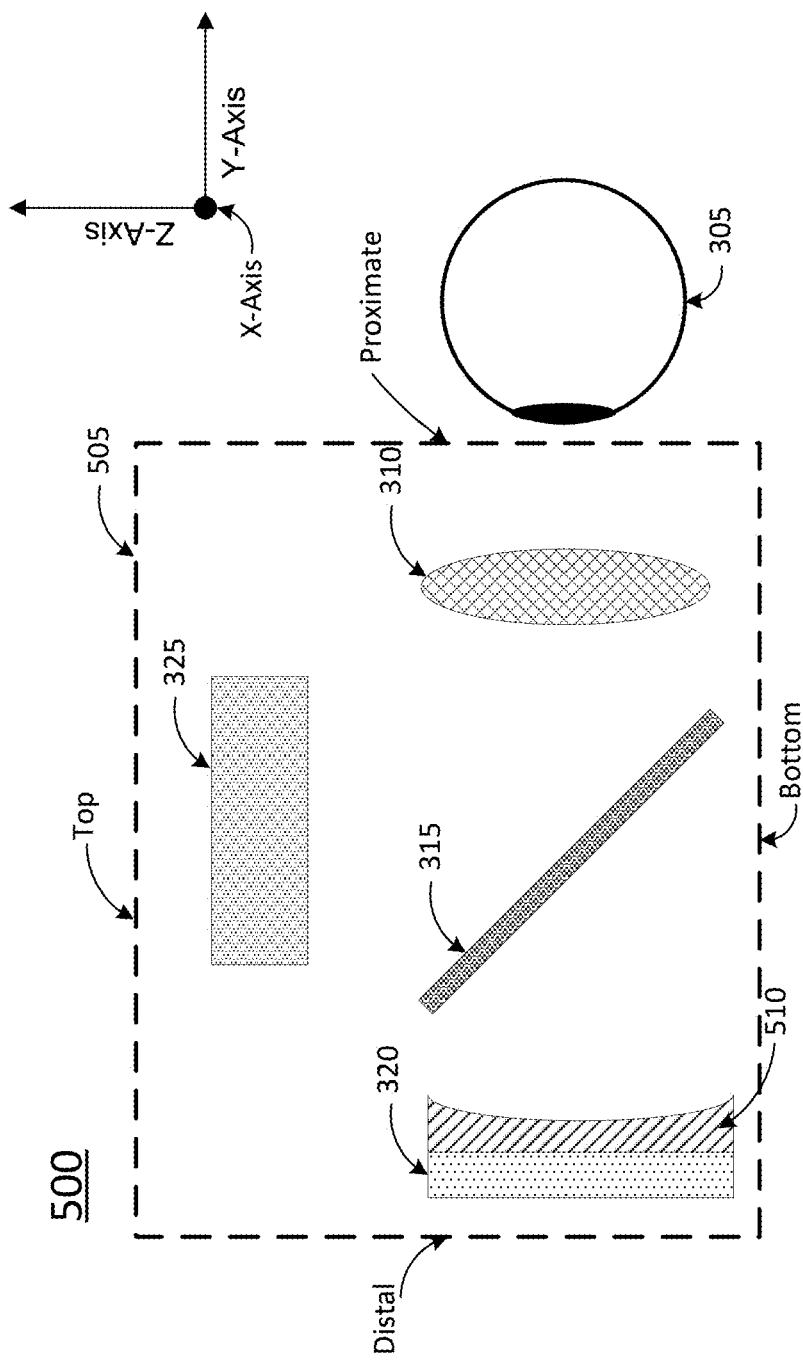

COMBINING A HIGH RESOLUTION NARROW FIELD DISPLAY AND A MID RESOLUTION WIDE FIELD DISPLAY

RELATED APPLICATION

This application claims priority to and the benefit of U.S. Provisional Patent Application No. 62/115,455, filed on Feb. 12, 2015, entitled "COMBINING A HIGH RESOLUTION NARROW FIELD DISPLAY AND A MID RESOLUTION WIDE FIELD DISPLAY", the contents of which are incorporated in their entirety herein by reference.

FIELD

Embodiments relate to virtual reality (VR) head mounted displays (HMD).

BACKGROUND

For a HMD system to provide an optimal foveal resolution over a horizontal field of a human eye, a display may include upwards of 9,000 columns and/or rows (e.g., a so-called 9K display) or more across the entire display.

SUMMARY

According to one general aspect, a head mounted display (HMD) includes a first display portion included in the HMD, the first display portion having a first pixel density, a second display portion included in the HMD, the second display portion having the first pixel density, a third display portion attached to the HMD, the third display portion having a second pixel density, and at least one image combiner configured to combine two images by reflecting an image projected by the first display portion and the second display portion and allowing an image projected by the third display portion to pass through the at least one image combiner.

According to another general aspect, a head mounted display (HMD) of a virtual reality (VR) system includes a first combined display system configured to receive a first image and a second combined display system configured to receive a second image the second image being a different view perspective of the first image. The first combined display system includes a first display portion configured to project a first portion of the first image, a second display portion configured to project a second portion of the first image, and an image combiner configured to combine two images by reflecting the first portion of the first image and allowing the second portion of the first image to pass through the image combiner. The second combined display system includes a third display portion configured to project a first portion of the second image, a fourth display portion configured to project a second portion of the second image, and an image combiner configured to combine two images by reflecting the first portion of the second image and allowing the second portion of the second image to pass through the image combiner.

According to still another general aspect, a head mounted display (HMD) includes a first display portion configured to project a first image, a second display portion configured to project a second image, and an image combiner configured to combine two images by reflecting the first image and allowing the second image to pass through the image combiner.

Implementations can include one or more of the following features. For example, the at least one image combiner can be further configured to block a portion of the image projected by the third display portion, the portion of the image projected by the third display portion corresponding to the image projected by the first display portion and the second display portion. The at least one image combiner can be further configured to block a portion of the image projected by the first display portion and the second display portion, the portion of the image projected by the first display portion and the second display portion corresponding to the image projected by the third display portion.

For example, the first pixel density can be a higher pixel density than the second pixel density, and the third display portion can be configured to reduce a brightness of a portion of the image projected by the third display portion, the portion of the image projected with reduced brightness by the third display portion corresponding to the image projected by the first display portion and the second display portion. The first pixel density can be a lower pixel density than the second pixel density, and the first display portion and the second display portion can be configured to reduce a brightness of a portion of the image projected by the first display portion and the second display portion, the portion of the image projected with reduced brightness by the first display portion and the second display portion corresponding to the image projected by the third display portion.

For example, the two images can be blended at a boundary between the two images. The HMD is communicatively coupled to a computing device configured to generate the two images using an optical fiber. The first pixel density can be a higher pixel density than the second pixel density, and the first display portion and the second display portion can be positioned above the third display portion. At least one of the first display portion, the second display portion and the third display portion can include a curved portion. The HMD can include at least one lens. The HMD can include at least one of a motion sensor and an eye tracking component each configured to detect a change in a view position of a user of the HMD.

For example, the HMD can be communicatively coupled to a computing device associated with an image repository via an optical fiber. The first display portion and the second display portion can have a first pixel density, the third display portion and the fourth display portion can have a second pixel density, the second pixel density being lower than the first pixel density, and the third display portion and the fourth display portion can include a curved portion. The first display portion and the second display portion can have a first pixel density, the third display portion and the fourth display portion can have a second pixel density, the second pixel density being lower than the first pixel density, and the first display portion and the second display portion are positioned above the third display portion and the fourth display portion.

For example, the first display portion can be configured to reduce a brightness of a portion of the first portion of the first image, and the third display portion can be configured to reduce a brightness of a portion of the first portion of the second image. The second display portion can be configured to reduce a brightness of a portion of the second portion of the first image, and the fourth display portion can be configured to reduce a brightness of a portion of the second portion of the second image.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the example embodiments and wherein:

FIGS. 5A, 5B and 5C illustrate a block diagram of a side view of another two display HMD according to at least one example embodiment.

Figure 1A:
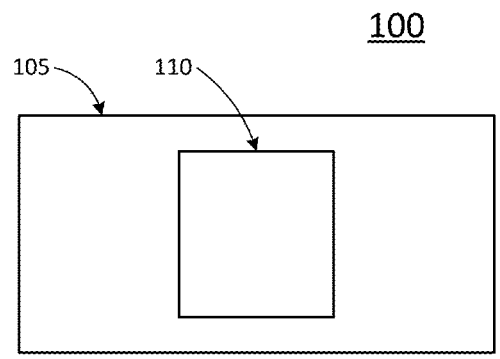
FIGS. 1A, 1B and 1C illustrate block diagrams of a head mounted display (HMD) according to at least one example embodiment.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of regions and/or structural elements may be reduced or exaggerated for clarity. The use of similar or identical reference numbers in the various drawings is intended to indicate the presence of a similar or identical element or feature.

DETAILED DESCRIPTION OF THE EMBODIMENTS

While example embodiments may include various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims.

In order to instill a feeling of presence and to instill a sense of belief while using a HMD, video imagery that matches human perception can be desirable. Human perception may require approaching a horizontal field of view (FOV) of about 150 degrees per eye for high peripheral vision. For the HMD system to provide foveal resolution over an entire horizontal field of 150 degrees, the required display may include 9,000 columns (e.g., a so-called 9K display). For an HMD system including a 9K display, if it were available, may necessitate the use of a large data rate, would have high power consumption, would be expensive, and may also contribute too an excessive weight for the HMD. Accordingly, an HMD system configured to display video imagery that matches human perception without use of a 9K display can be desirable.

FIG. 1A illustrates a block diagram of a head mounted display (HMD) according to at least one example embodiment. As shown in FIG. 1A, the HMD 100 includes a first display 105 and a second display 110. The first display 105 can have a first pixel density and the second display 110 can have a second pixel density. For example, the first display 105 can be a mid resolution display having pixel density in the range of 250 to 800 pixels per inch (ppi) and the second display 110 can be a high resolution display having pixel density higher than 800 ppi. In other words, the first display 105 can have a pixel density less than a pixel density of the second display 110. The second display 110 can be configured to display images and/or video data in a field of vision associated with a high resolution region of binocular overlap (described in more detail below). The first display 105 may be configured to display images and/or video in a field of vision outside of, or peripheral to, the high resolution region of binocular overlap, including a further region of binocular overlap including a lower resolution. Two displays in the HMD of FIG. 1A may be configured to display three-dimensional (3D) and/or stereographic images.

Figure 1B:
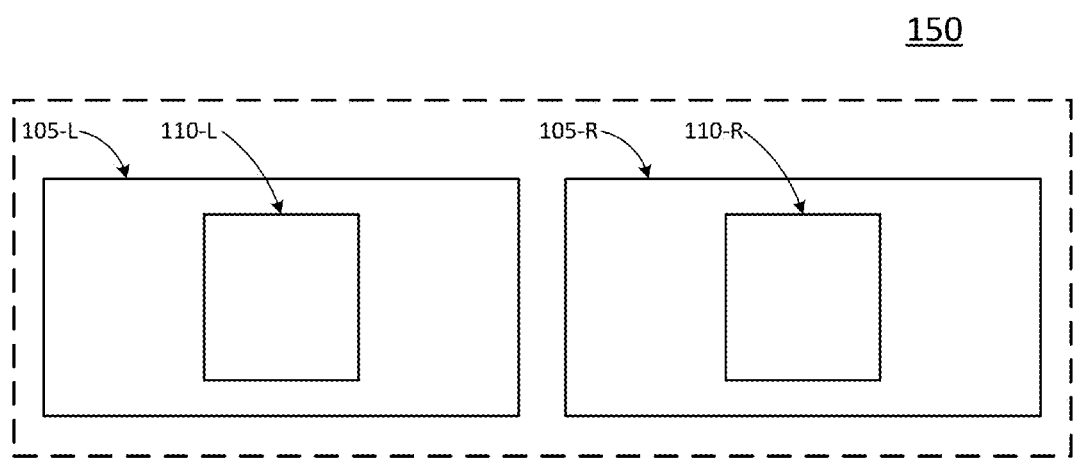

FIG. 1B illustrates a block diagram of a head mounted display (HMD) according to at least one example embodiment. As shown in FIG. 1B, the HMD 150 includes a first display 105-L, a second display 105-R, a third display 110-L and a fourth display 110-R. The first display 105-L and the second display 105-R can be formed as a single display. As such, the first display 105-L and the second display 105-R can each be a portion of a single display. Further, the third display 110-L and the fourth display 110-R can be formed as a single display. As such, the third display 110-L and the fourth display 110-R can each be a portion of a single display. Accordingly, the first display 105-L, the second display 105-R, the third display 110-L and the fourth display 110-R can be referred to as the first display portion 105-L, the second display portion 105-R, the third display portion 110-L and the fourth display portion 110-R.

The first display 105-L and the second display 105-R can have a first pixel density and the third display 110-L and the fourth display 110-R can have a second pixel density. For example, the first display 105-L and the second display 105-R can be mid resolution displays having pixel density in the range of 250 to 800 pixels per inch (ppi) and the third display 110-L and the fourth display 110-R can be high resolution displays having pixel density higher than 800 ppi. In other words, the first display 105-L and the second display 105-R can have a pixel density less than a pixel density of the third display 110-L and the fourth display 110-R. The third display 110-L and the fourth display 110-R can be configured to display images and/or video data in a field of vision associated with a high resolution region of binocular overlap (described in more detail below).

The first display 105-L and the second display 105-R may be configured to display images and/or video in a field of vision outside of, or peripheral to, the high resolution region of binocular overlap, including a further region of binocular overlap including a lower resolution. The first display 105-L and the third display 110-L can be associated with a left eye and display a left eye image in a 3D image or video. The second display 105-R and the fourth display 110-R can be associated with a right eye and display a right eye image in the 3D image or video. In an alternative embodiment, the first display 105-L and the second display 105-R are formed from one integral display panel capable of showing an image that is partitioned into two parts comprising left and right images. The HMD of FIG. 1B may be configured to display three-dimensional (3D) and/or stereographic images.

Figure 1C:
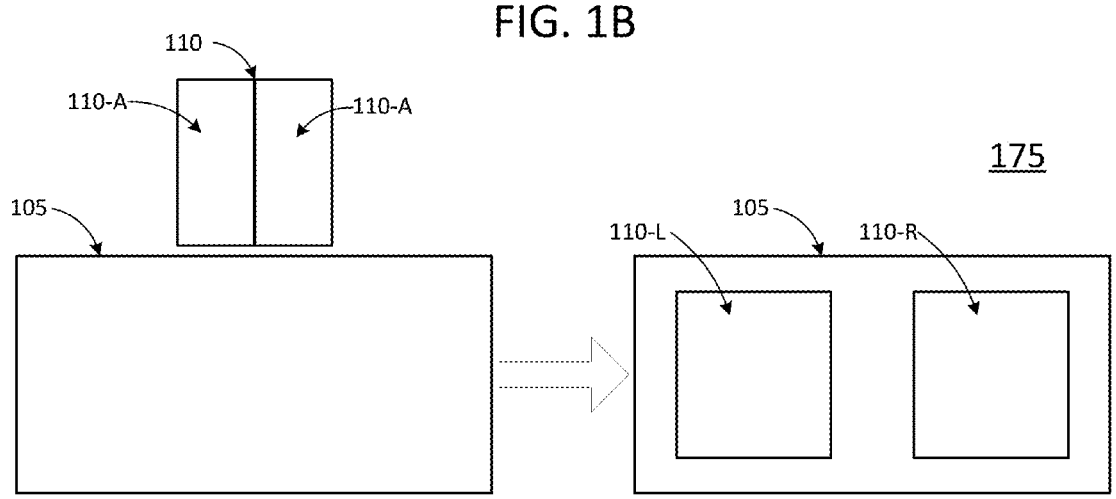

FIG. 1C illustrates a block diagram of a head mounted display (HMD) according to at least one example embodiment. As shown in FIG. 1C, the HMD 175 includes a first display 105 and a second display 110. The first display 105 can have a first pixel density and the second display 110 can have a second pixel density. For example, the first display 105 can be a mid resolution display having pixel density in the range of 250 to 800 pixels per inch (ppi) and the second display 110 can be a high resolution display having pixel density higher than 800 ppi. In other words, the first display 105 can have a pixel density less than a pixel density of the second display 110. The second display 110 can include at least one portion 110-A such that when images projected by the at least one portion 110-A are combined with images projected by the first display 105 a display including display portion 110-L and display portion 110-R is formed. The HMD of FIG. 1C may be configured to display three-dimensional (3D) and/or stereographic images.

Figure 2A:
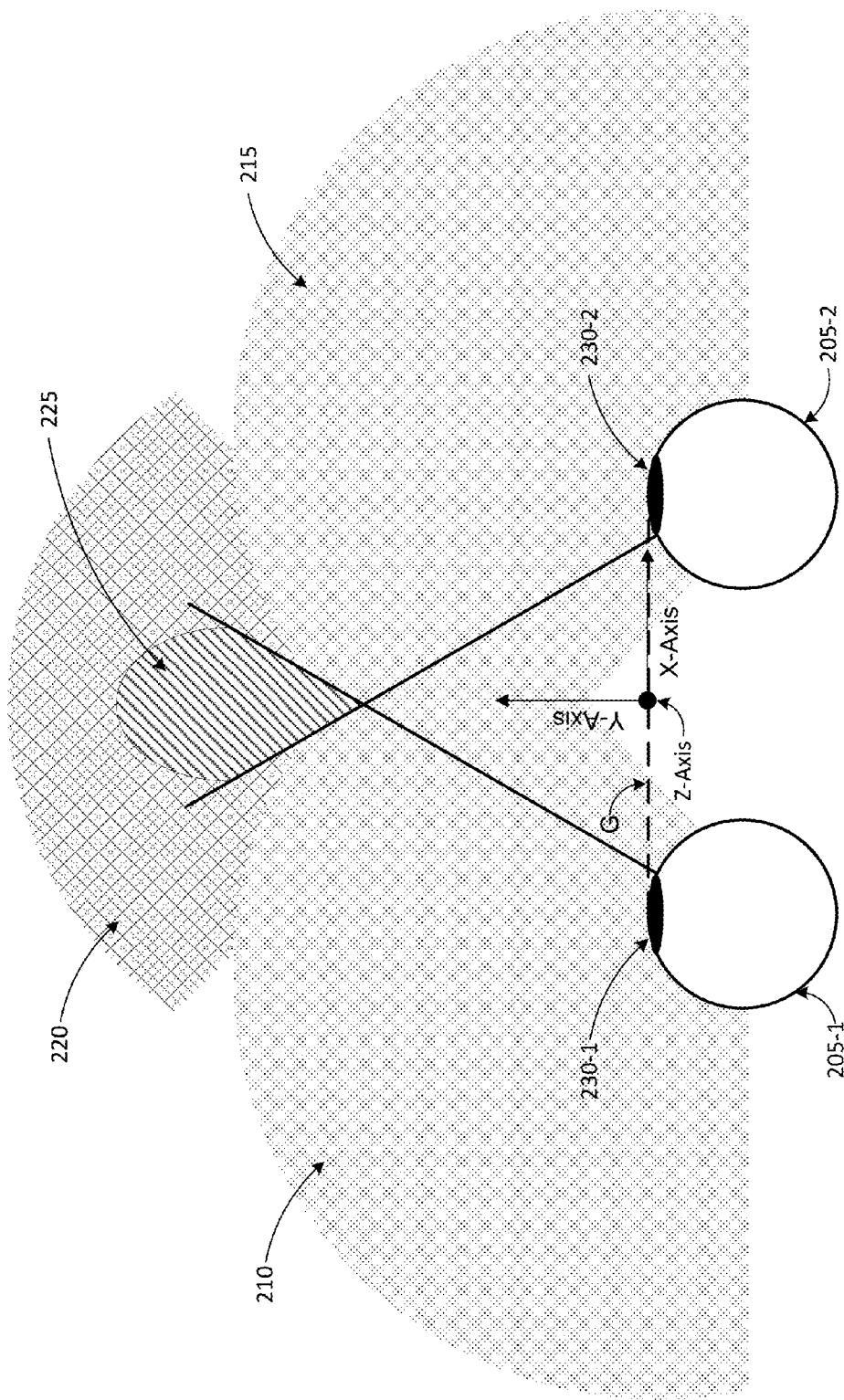
FIG. 2A illustrates a schematic representation of visual fields.
Figure 2B:
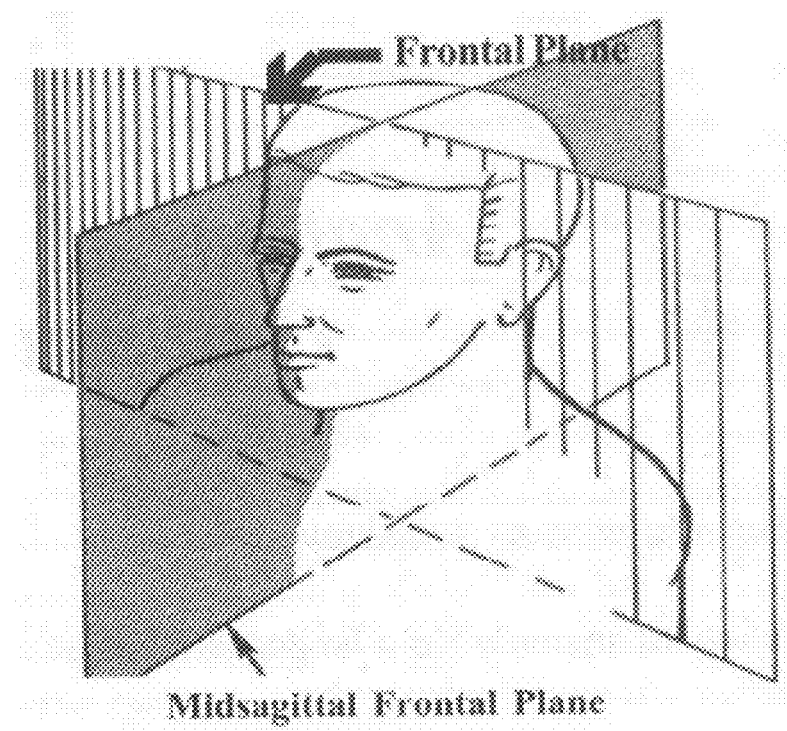
FIG. 2B illustrates the frontal plane and the midsagittal frontal plane.
Figure 2C:
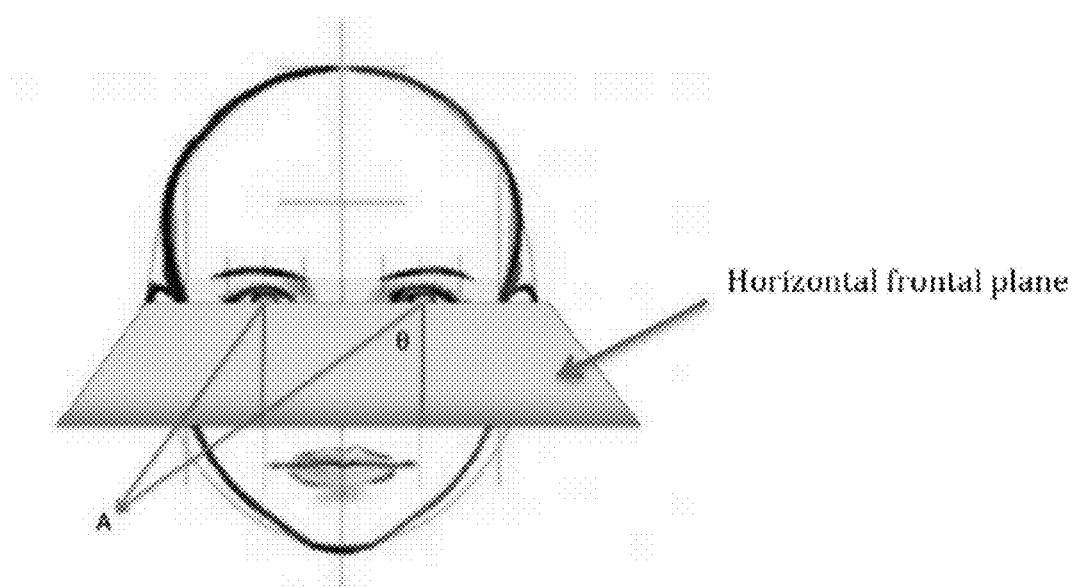
FIG. 2C illustrates a plane orthogonal to the frontal planes that bisects the eyes. Also shown are the gaze vectors from the eyes to a point A.

FIG. 2 illustrates a schematic representation from a top view of horizontal visual fields. As shown in FIG. 2, eyes 205-1, 205-2 (e.g., human eyes), including pupils 230-1, 230-2, can visually perceive a left visual field 210 and a right visual field 215. Within the left visual field 210 and the right visual field 215, the eyes 205-1, 205-2 can visually perceive a full binocular overlap visual field 220 which may be as large as 120 deg. A sub-region of full binocular overlap is shown as a high resolution region of binocular overlapping visual field 225. As shown in FIG. 2B (and throughout this description), a vertical plane which we term the midsagittal frontal plane bisects the head between the eyes, and a vertical plane that we call the vertical frontal plane intersects the head orthogonal to the midsagittal plane at a position that bisects the eyes 205-1 and 205-2. FIG. 2C shows a horizontal plane that extends in a direction left and right (or horizontally) with respect to the eyes 205-1, 205-2 and that also bisects the eyes. We call the plane in FIG. 2C the horizontal frontal plane. The three planes defined in FIGS. 2B and 2C intersect at the midpoint of a line segment extending from the center of the left eye to the center of the right eye.

The fovea is the central portion of the retina of each of the eyes 205-1, 205-2 that perceives the highest resolution. The direction of gaze (illustrated by vector G parallel to the midsagittal plane) may be defined by a vector from the center of the fovea through the center of the pupil. Neither eye 205-1 nor eye 205-2 turns or rotates with sufficient comfort to allow the direction of gaze to scan the full horizontal visual field 210 or 215. Therefore, imagery beyond the comfortable turning limit of the eyes 205-1, 205-2 will not be viewed by the fovea (although such imagery will be viewed by other parts of the retina). Accordingly, peripheral images provided by a VR system do not need to be at foveal resolution. As a result, a high resolution (e.g., a 9K) display projected onto the retina across the entirety of the left horizontal visual field 210 and the right horizontal visual field 215 may not be necessary or desirable (i.e., technically or cost prohibitive). Accordingly, example embodiments can utilize two displays within an HMD for a VR system. One of the two displays (e.g., the second display 110) can be configured to display images and/or video in the high resolution region of binocular overlap visual field 225 that will be projected on or near the fovea. Another of the two displays (e.g., the first display 105) can be configured to display images and/or video outside of, or peripheral to, the high resolution region of the binocular overlap visual field 225. In other words, a display can be configured to display images and/or video in the regions of the left visual field 210 and the right visual field 215 and the full binocular overlap visual field 220 that are not inclusive of the high resolution region of binocular overlap visual field 225.

It should be noted that although the fovea subtends only a small arc, the rotation of the eyes can extend the range of angles over which a display should match foveal resolution. When the user's eyes move and the direction of gaze changes, such as when reading, resolution matching the fovea is desirable over the range of comfortable gaze scanning. The range of comfortable gaze scanning is approximately 15 degrees in any direction with respect to vector G in FIG. 2A. The gaze can scan over larger angles with progressively more discomfort as the scan angle increases beyond 15 degrees from the mid-sagittal plane.

In an example implementation of an HMD (while referring to FIG. 2C), all horizontal angles (e.g., angles along the horizontal frontal plane such as θ) can be measured with respect to the mid-sagittal frontal plane (i.e. the plane of head symmetry centered between the eyes. The left visual field 210 and the right visual field 215 regions represent the visual fields of the left and right eyes that can be supplied images from a low or medium resolution display (or displays) with partial binocular overlap that can be as much as 120 degrees per eye (e.g., the full binocular overlap visual field 220 region, matching the overlap in the human visual system). The high resolution region of binocular overlap visual field 225 can be supplied by left and right high resolution displays with 100% overlap. Accordingly, a high resolution binocular image (e.g., as displayed using high resolution displays, the second displays 110 or the second displays 325 described below) can have a field of view (FOV) of, for example, 60 degrees which is approximately double the FOV needed to account for comfortable eye motion. In this way, foveal resolution (e.g., 1 minute of arc) can be provided at double the range of comfortable eye motion (from 15 to +15 degrees), and a lower resolution image (e.g., as displayed using a lower resolution display, the first display 105 or the first display 320 described below) can be provided beyond 60 degrees. If two low or medium resolution images provide 150 degrees FOV to the left and right eyes, with an overlap of 120 degrees, then the combined total FOV can be about 180 degrees. In other words, the first display 105 (or the first display 320 described below) could be provided in the form of left and right displays which when combined are configured to provide a combined FOV of about 180 degrees.

Other implementations are within the scope of this disclosure. For example, the high resolution image (e.g., as displayed using the second display 325 described below) can have a FOV of, for example, a range between 40 and 90 degrees. The two low or medium resolution images (e.g., as displayed using a lower resolution display, the first display 105 or the first display 320 described below) can have a complementary (to the high resolution image) FOV range in order to cover a combined total FOV of about 180 degrees.

Figure 3A:
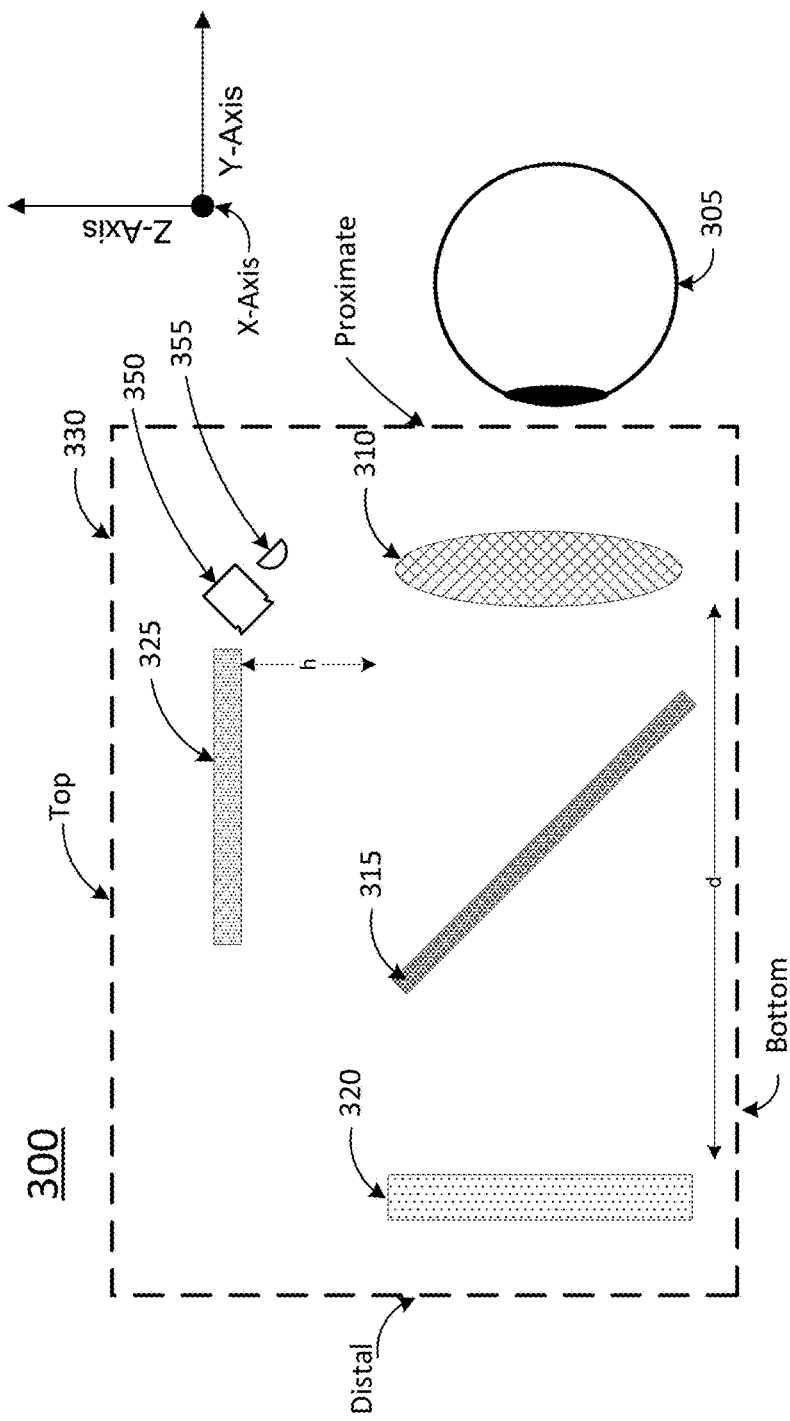
FIGS. 3A, 3B and 3C illustrate a block diagram of a side view of a two display HMD according to at least one example embodiment.
Figure 3C:
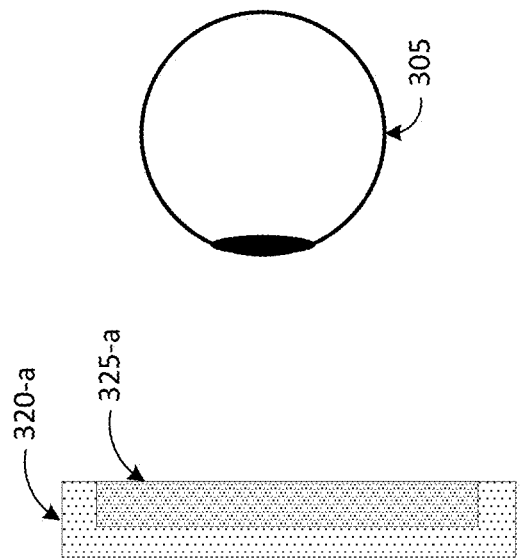
Figure 3B:
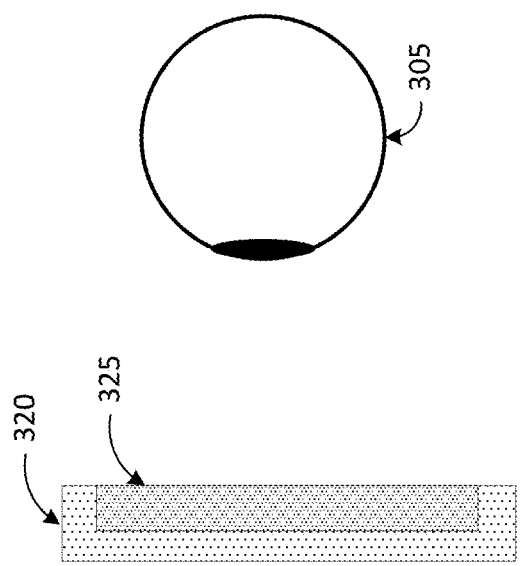

FIGS. 3A and 3B illustrate a block diagram of a side view of a two display per eye HMD 300 according to at least one example embodiment. As shown in FIG. 3A, a combined display system 330 includes a lens 310, an image combiner 315, a first display 320 and a second display 325 (all shown in cross section). An eye 305 (one is shown, but it is understood that the HMD includes a matching system for the other eye) visually perceives the images (illustrated as 320-*a* and 325-*a* in FIG. 3C) of the combined display system 330 as a single image including the image from the first display 320 and the image from the second display 325 as shown in FIG. 3B. Away from the eye 305 is labelled as distal, close to the eye 305 is labelled as proximate. Top and bottom are labelled as a descriptive convenience. However, top and bottom could be switched with a corresponding alteration of component positions.

In an example implementation, the first display 320 and the second display 325 can be different in size so as to subtend different fields of view. The resultant corresponding images 320-*a* and 325-*a* subtend different fields of view, as shown in FIG. 3C. As such, two smaller high resolution displays (one for each eye) can be used, for example, to subtend a central field of view of about 60 degrees (e.g., to create the high resolution region of binocular overlap visual field 225), and lower resolution larger displays can be used, each to subtend an angle of 150 degrees (e.g., in the regions including the high resolution region of binocular overlap visual field 225 and beyond). In other words, the first display 320 can be a larger, lower resolution display and the second display 325 can be a smaller, higher resolution display. In order to preserve the high resolution image 325-*a* produced by display 325, pixels in display 320 can be set to black if their images overlay pixels in the image 325-*a* of display 325. In other words, display 320 may show a black rectangle in the region of high resolution so that its image does not interfere with the image of display 325. Alternatively, the images may be arranged so that low resolution features in region 225 are provided by the lower resolution display 320, and higher resolution features in region 225 are provided by high resolution display 325.

The term resolution in the context of the display emitting area refers to the number of pixels in a given unit of surface area, or the density of pixels (or pixel density). The higher resolution display would have a higher density of pixels or pixel density than the lower resolution display so that in the combined virtual image, the pixels of the higher resolution display subtend a smaller angle than the pixels of the lower resolution display. The resolution (or density) of pixels is typically expressed as pixels per inch In example implementations, the first display 320 (e.g., low or medium resolution display) can be used to extend the horizontal field of view to the left and right of, as well as above and below, the second display 325 (e.g., high resolution display). In some implementations, the display (e.g., the first display 320), pixels near the temporal ends are far from the center of the optical axis (vector G). As a result, image distortions and image aberrations can become more noticeable (and in some cases severe). These aberrations and distortions are generally a function of distance from the optical axis, becoming more severe as the pixels are located at gaze angles farther from the optical axis. Accordingly, the lens 310 may be configured to correct for these distortion and aberrations. The lens 310 may be, for example, a toric or an aspherical lens. Although in cross section a simple double convex lens is shown, the lens may have any shape and/or may be a Fresnel lens. Additionally, the image may be inversely distorted by the software generating the pixel data before the data are supplied to the display, so that distortion by the lens cancels the inverse distortion, yielding an undistorted viewable image.

The image combiner 315 may be configured to combine (e.g., optically combine) an image 320-*a* from the first display 320 and an image 325-*a* from a second display 325. For an HMD built for two eyes which can require four displays (as shown in FIG. 1B), the resultant image can be of a high resolution in a region of the high resolution region of binocular overlap visual field 225 (produced by the two high resolution displays) and of a lesser resolution in at least one region peripheral to the high resolution region of binocular overlap visual field 225, produced by at least one of the medium resolution displays.

In the example implementation shown in FIG. 3A, the image combiner 315 may be configured to reflect light rays emitted from the second display 325 toward the lens 310 (e.g., by orienting the image combiner at an angle (e.g., 30, 45, 60 and/or the like degrees) between the second display 325 and the lens 310). Further, the image combiner 315 may be configured to allow light rays emitted from the first display 320 to pass through the image combiner 315 toward the lens 310. The image combiner 315 may be configured to reflect (substantially or partially reflect) light associated with an image as transmitted from the second display 325 toward the lens 310. Further, the image combiner 315 may be configured to allow light to pass through (substantially or partially pass through), the light being associated with an image as transmitted from the first display 320 toward the lens 310.

In an example implementation, the image combiner 315 may be configured to reflect a portion of a projected image (e.g., a portion of the projected photons or a portion of the luminance representing the image) such that less than all of the image is reflected and/or the intensity of the light associated with all of the image may be reduced with the reflection and/or the intensity of the light associated with one or more portions of the image may be reduced with the reflection. Further, the image combiner 315 may be configured to pass through a portion of an image such that less than all of the image is passed through and/or the intensity of the light associated with all of the image may be reduced and/or the intensity of the light associated with one or more portions of the image may be reduced. Accordingly, the image combiner 315 may be configured to combine light associated with two images by reflecting a portion of the light associated with an image as transmitted from the second display 325 and allowing a portion light associated with an image as transmitted from the first display 320 to pass through the image combiner 315.

In an example implementation, the image combiner 315 can operate as a semi-transparent mirror on which images can be both reflected and transmitted. To this end, the image combiner 315 can be constructed of a transparent material (e.g., glass) with one side coated with a semi-reflective material (e.g., a thin layer of silver, aluminum, another metal, or a series of dielectric coatings). Example thin film optical coatings can include aluminum, gold, silver, chrome, nickel, aluminum-$MgF_2$, magnesium fluoride, aluminum-$SiO2$, silicon dioxide, zinc sulfide, and the like. Combiners and/or beam splitters are commercially available that can transmit and reflect in various ratios depending on the thickness of the coatings. As long as the reflective coating is sufficiently thin (e.g., in the nano/micro meter range), portions of the photons from each display will be both transmitted and reflected so that the projected images will pass through or reflect via the image combiner 315. By using a coating of the appropriate thickness (e.g., in the nano/micro meter range), the brightness of the two displays may be balanced.

The combiner may also have films designed to reflect infrared (IR) light from an LED in order to make possible eye tracking. In such an embodiment, the eye is illuminated with low level IR light from a source 355 near display 325. The light reflects from the combiner 315, and is directed through the lens 310 toward the eye 305 to illuminate the eye with IR light. The light reflected by the eye is reflected by the combiner 315 and collected by a camera 350 placed near the display 325. In this way the combiner 315 enables a collection of an image of the eye 305 and from this image the direction of gaze can be determined.

In example implementations, the first display 320 may be configured to (e.g. controlled to) reduce in intensity (e.g., brightness or luminosity) the portion of a projected image corresponding to a position of the second display 325. Alternatively, or additionally, the image combiner 315 can have a portion or area configured to absorb or not allow through (e.g., apply a light absorbing material or coating) the portion of a projected image corresponding to a position of the second display 325. Accordingly, a portion of the image projected by the first display 320 may not be observable through the image combiner 315 because the portion of the projected image corresponding to the position of the second display 325 is not bright enough or is not as bright as the image projected by the second display 325 For example, if the intensity of the photons from display 320 is over 100 times lower than light from corresponding pixels of display 325, the relative brightness will be so low as to be ignorable. Depending on the transmission of the combiner and the relative brightness of the displays, in the area of image of display 320 where it overlays the image of display 325, the image from display 325 could be 1000 times brighter. In such a case, the image from display 320, while possibly present in a minor amount, will not be observable by the retina because the image from display 325 is overwhelmingly brighter. Additionally, since the images are the same except for resolution, the minor presence of the image from display 320 is not discernable. Such an embodiment would be obtained if at the center of the combiner the transmission is 0.1% and the reflection is 99.9%. In that case, if the displays 325 and 320 have approximately the same brightness, the portion of the images viewed through the center of the combiner would have a brightness ratio of 999:1.

Figure 3D:
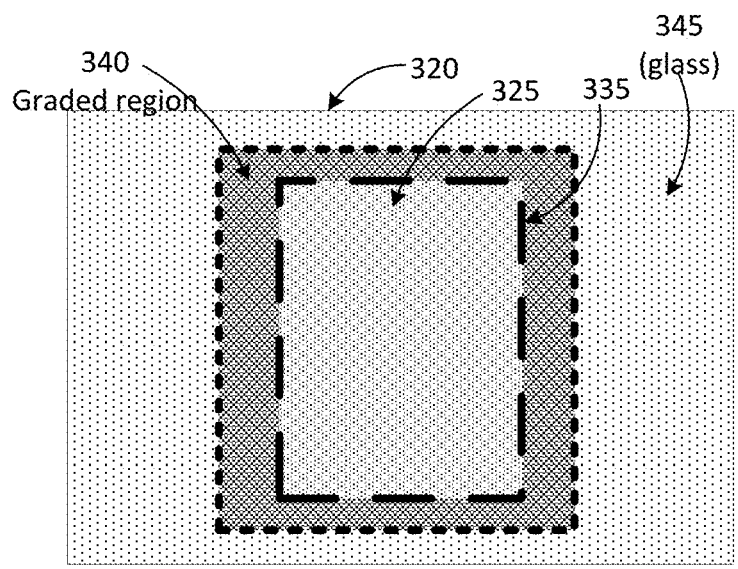
FIGS. 3D and 3E illustrates a block diagram of a front view of a two display HMD of FIGS. 3A and 3B according to at least one example embodiment.
Figure 3E:
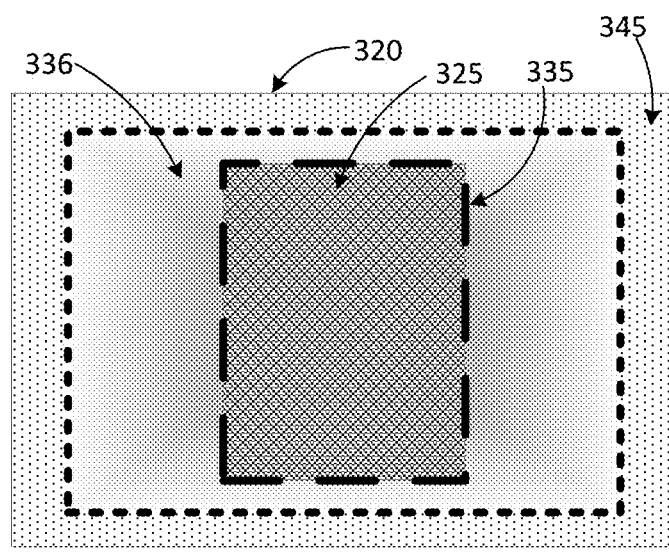

In some example implementations, the image combiner 315 may be configured to provide a transition between an image 320*a* projected by the first display 320 and an image projected by the second display 325. For example, beginning along a boundary 335 (illustrated as a dashed line in FIG. 3D) within the coating comprising the active part of the image combiner 315 between the first display 320 and the second display 325, the image combiner 315 coating may be configured to reflect progressively less of the image projected from the second display 325 as compared to the center of the image combiner 315. Alternatively, along the boundary of the image combiner 315 between the first display 320 and the second display 325, the image combiner 315 may be configured to allow less of the image projected from the first display 320 as compared to the outer portions of the first display 320. For example, by gradually and progressively reducing the thickness of metal coatings (e.g. by grading the coating thickness in the region 336 as shown in FIG. 3E) beginning at boundary 335 and progressing toward the edges of the combiner 315, the edges of a semi-transparent mirror may be hidden. The edges of the combiner 315 comprise clear glass or plastic. In this way, the image of the low resolution display is highly suppressed near the center of the high resolution display, but the edges of the optical coating of the combiner are not evident. The edges of the combiner can be further hidden by beveling the clear substrate.

The combiner may alternatively be formed by a polarization beam splitter coating on glass or other transparent substrate. Such coatings transmit one linear polarization and reflect the orthogonal linear polarization. If the displays 320 and 325 have light output that is linearly polarized appropriately (such as with properly oriented LCDs), then the polarization beam splitter may be employed as an optical combiner with less optical loss relative to a metallic film combiner. Whereas the metal film may have an optical transmission or reflection of only about 49%, the polarizing film may have a transmission or reflection of greater than 80% for appropriately polarized light.

The presence of a high pixel density may not dictate that the high resolution display should be operated at high resolution in all regions. For example, the two images (e.g., as projected by the high resolution display and the low resolution display) can be blended at a boundary between the two images. By combining data on neighboring pixels, the pixel density (or resolution) can be blended so that the resolution does not change abruptly at the boundaries of the image of the high resolution display. It is also possible to adjust luminance and contrast so that edges are not obvious, so that as the high resolution display fades out, the low resolution display fades in, in order to blend the two images into one image. This feathering may also be used to hide the boundaries of the binocular overlap region so that the eye can move from the binocular overlap region to the non-overlap region without perception of a change in brightness or contrast. In such a case, contrast and luminance feathering would be applied to both displays at the boundary of binocular overlap.

Therefore, the first display 320 and the second display 325 may be configured to and/or controlled (e.g., as controlled by a video driver) to provide a transition (in addition to and/or as an alternative to the configuration of the image combiner 315) between an image projected by the first display 320 and an image projected by the second display 325. For example, the first display 320 can be configured to project a progressively darker (e.g., progressive darkening of the pixels nearing the boundary 335) until there is a dark (e.g., black) image at the center of the first display 320 corresponding to the center of the image combiner 315. Further, the second display 325 can be configured to project a progressively darker image (which should progressively reduce reflection from the image combiner 315) from pixels of the second display 325 at some threshold margin distance in from the boundary between the images of the first display 320 and the second display 325, toward the edge of the second display 325 until there is a dark (or black) image at an outer boundary of the second display 325.

In another implementation (or in combination with other implementations) pixels along the boundary can be spatially dithered. Spatial dithering can include alternating driving by applying control voltages to the pixels of the first display 320 and the second display 325 in proximity of the boundary. For example, for the first display 320, odd pixels along the horizontal and vertical axis of the boundary can be off (or black) whereas even pixels can be based on the image. Further, for the second display 325, even pixels along the horizontal and vertical axis of the boundary can be off (or black) whereas odd pixels can be based on the image.

The example configuration of the combined display system 330, the first display 320 can be the low or medium resolution display which is positioned at the top of the combined display system 330 and the second display 325 can be the high resolution display which is positioned distal (e.g., at a far end of the combined display system 330 when compared to the eye 305) of the combined display system 330. Accordingly, the image of the low or medium resolution display can be positioned behind the high resolution display (see FIG. 3B) as visually perceived by the eye 305.

Example embodiments can use a high resolution display (e.g., the second display 325). A high resolution display can be a display with a pixel subtense in a virtual image plane of less than 2 minutes of arc. For a binocular overlap high resolution region (e.g., the high resolution region of binocular overlap visual field 225) of approximately 60 degrees, a display having 1800 columns should be used to achieve 2 minutes per pixel, and 3600 columns should be used to achieve 1 minute per pixel, at the center of the field. If the vertical FOV is also approximately 60 degrees, then the displays should be either 1800×1800 (2 min per pixel) or 3600×3600 (1 min per pixel) in format. For mounting on the head, pixel pitch should be in the range of 5 to 15 microns, nominally 10 microns, which can result in nominal object image diagonal dimensions of between 25 mm for the 1800 pixel format and 50 mm for the 3600 pixel format. A larger display can advantageously require less magnification.

Example embodiments can use low or medium resolution display (e.g., the first display 320). The low or medium resolution display can have approximately one tenth of the resolution of the high resolution display. Therefore, the pixel subtense at the virtual image is about 10 minutes of arc. Because the full horizontal field of view for the low or medium resolution display is about 150 degrees, the number of columns should be 900, depending in part on whether the display is flat or curved. If the vertical FOV is approximately 90 degrees, then the number of rows should be 540. If a 10 micron pixel is used to obtain 1 minute of arc in the center of the high resolution display, then a 100 micron pixel can be used to obtain 10 min of arc in the center of the low or medium resolution display (because the magnification is approximately the same for both displays). Accordingly, the low or medium resolution display can be nominally 90 mm×54 mm. The use of additional pixels or higher pixel density can be desirable for extending the vertical field of view or for improving the blending of the fused images at the boundaries of the high resolution virtual image (e.g., blending along a boundary of the image combiner 315 between the first display 320 and the second display 325). In other words, use of additional pixels or higher pixel density can provide another mechanism to improve the transition between an image projected by the first display 320 and an image projected by the second display 325.

In some example implementations the virtual image of the first display 320 (e.g., the low or medium resolution display) may be placed at a distance d from the lens 310 and the virtual image of the second display 325 (e.g., the high resolution display) may be placed at a distance h from the lens 310. Distance d can be a greater distance from the lens 310 (for example 200 cm) than the distance h, which may be placed at a near distance to the lens 310 (such as 1 cm). Accordingly, background imagery can be placed on the first display 320 (e.g., the low or medium resolution display), and foreground imagery on the near display, thus overcoming image convergence and accommodation disparity in a three dimensional (3D) display. In other implementations, the virtual image distance of the two images 320-a and 325-a are the same.

Figure 4:
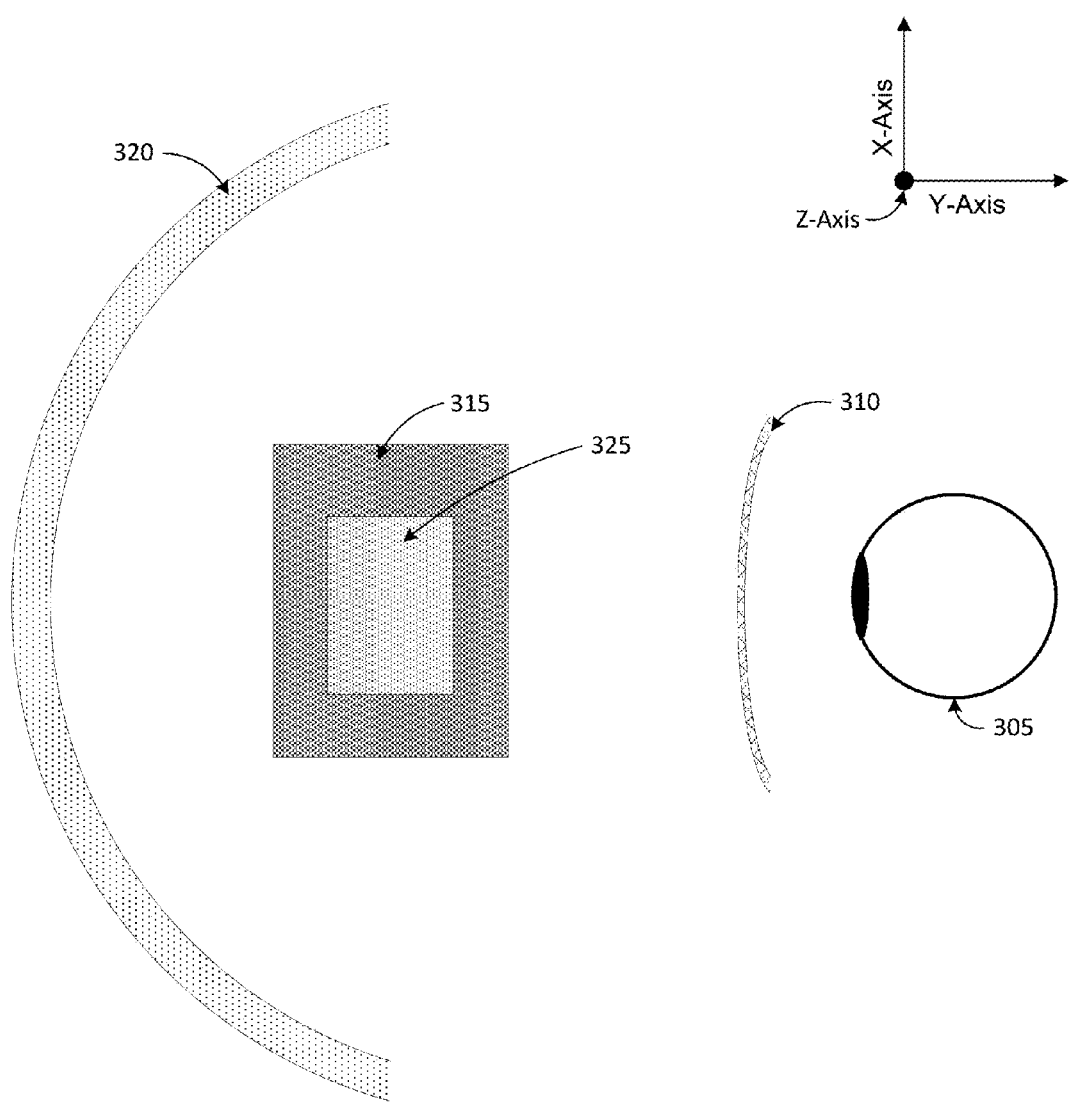
FIG. 4 illustrates a block diagram of a top view of the two display HMD of FIGS. 3A and 3B according to at least one example embodiment.

FIG. 4 illustrates a schematic diagram of a top view of the two-display HMD of FIGS. 3A and 3B according to at least one example embodiment. As shown in FIG. 4, the first display 320 is formed as an arc or is a curved display. FIG. 4 shows a display 320 with a constant radius of curvature, but any complex curve may be used, including a flat surface near the mid-sagittal plane combined with progressively more curvature toward the temple. In some implementations, the display (e.g., the first display 320), toward the temporal ends, can become progressively more off center. As a result, image distortions and image aberrations can become more noticeable (and in some cases severe). Using a curved display as the first display 320 (e.g., the low or medium resolution display) can reduce or minimize some of the image distortions and image aberrations. In particular, field curvature that is introduced by the optics can be reduced by curvature of the display.

Therefore, using a curved display as the first display 320 in addition to the lens 310 (or as an alternative to using the lens 310) can improve the image displayed by the first display 320 particularly when viewed from angles of gaze not aligned with the optical axis (vector G shown in FIG. 2). In addition, using the curved display as the first display 320 in addition to the lens 310 (or as an alternative to using the lens 310) can increase the field of view (FOV) of a user of the HMD. Still further, the first display 320 can be a formed as straight or flat panel display. In this case (as discussed above), the lens 310 may be configured to reduce or minimize the image distortions and image aberrations. In another example implementation, the driver associated with the first display 320 can be configured to alter the image in order to correct for the distortions.

Figure 5C:
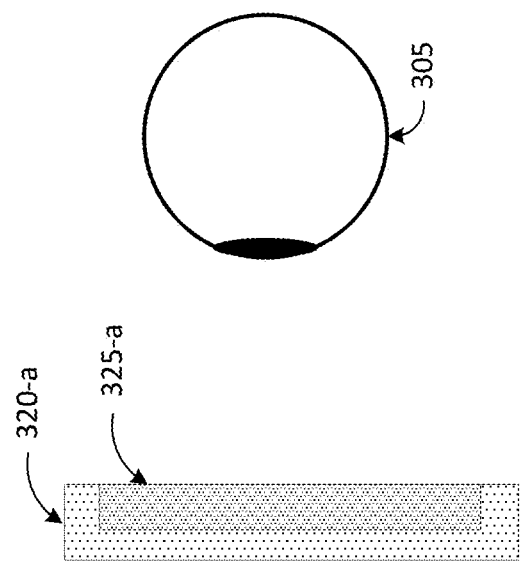
Figure 5B:
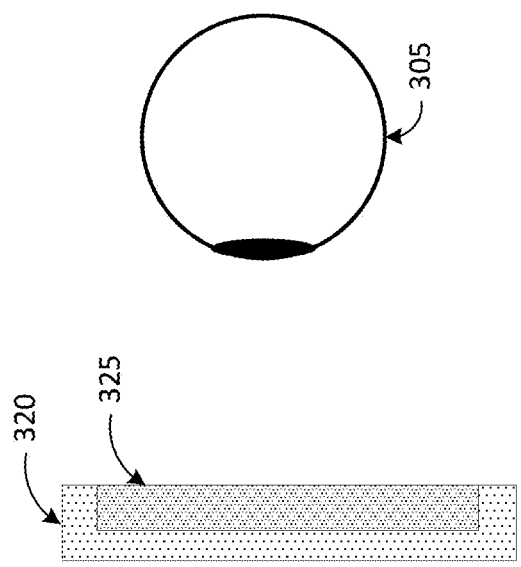

FIGS. 5A and 5B illustrate a schematic diagram of a side cross section view of another two-display HMD 500 according to at least one example embodiment. As shown in FIGS. 5A and 5B, a combined display system 505 includes the lens 310, the image combiner 315, the first display 320, the second display 325 and a faceplate 510. An eye 305 (one is shown, but it is understood that the HMD includes a matching system for the other eye) visually perceives the combined image from the display system 505 as a single image including the image 320-a projected from the first display 320 and the image 325-a projected from the second display 325 as shown in FIG. 5C. The operation of the combined display system 505 is substantially similar to the combined display system 330 with the exception of the faceplate 510.

Figure 5D:
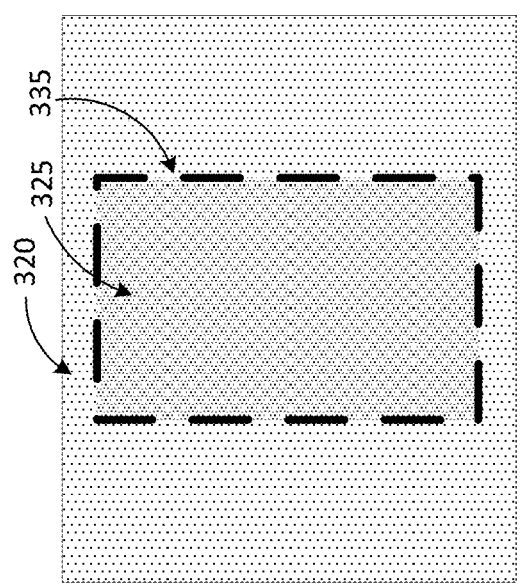
FIG. 5D illustrates a block diagram of a front view of a two display HMD of FIGS. 5A and 5B according to at least one example embodiment.

FIG. 5D illustrates a block diagram of a front view of a two display HMD of FIGS. 5A and 5B. As shown in FIG. 5D, the second display 325 is surrounded by the border 335 which in-turn indicates a boundary between the first display 320 and the second display 325. The image 320-a projected from the first display 320 and the image 325-a projected from the second display 325 would project out of the page.

The faceplate 510 may be configured to convert an image projected from the first display 320 (as a flat surface or flat panel display) to a curved surface. For example, the faceplate 510 may be an optical faceplate. An optical faceplate can be (or be similar to) a coherent fiber bundle which can relay an image from a flat surface to a curved surface. In an example implementation, the first display 320 can be an emissive display. The use of the faceplate 510 can be desirable for use with an emissive display because the input to the faceplate 510 can be in near contact with the imaging surface of the first display 320. By near contact, we mean that the distance from the pixel plane to the faceplate is less than the pixel pitch.

Figure 6:
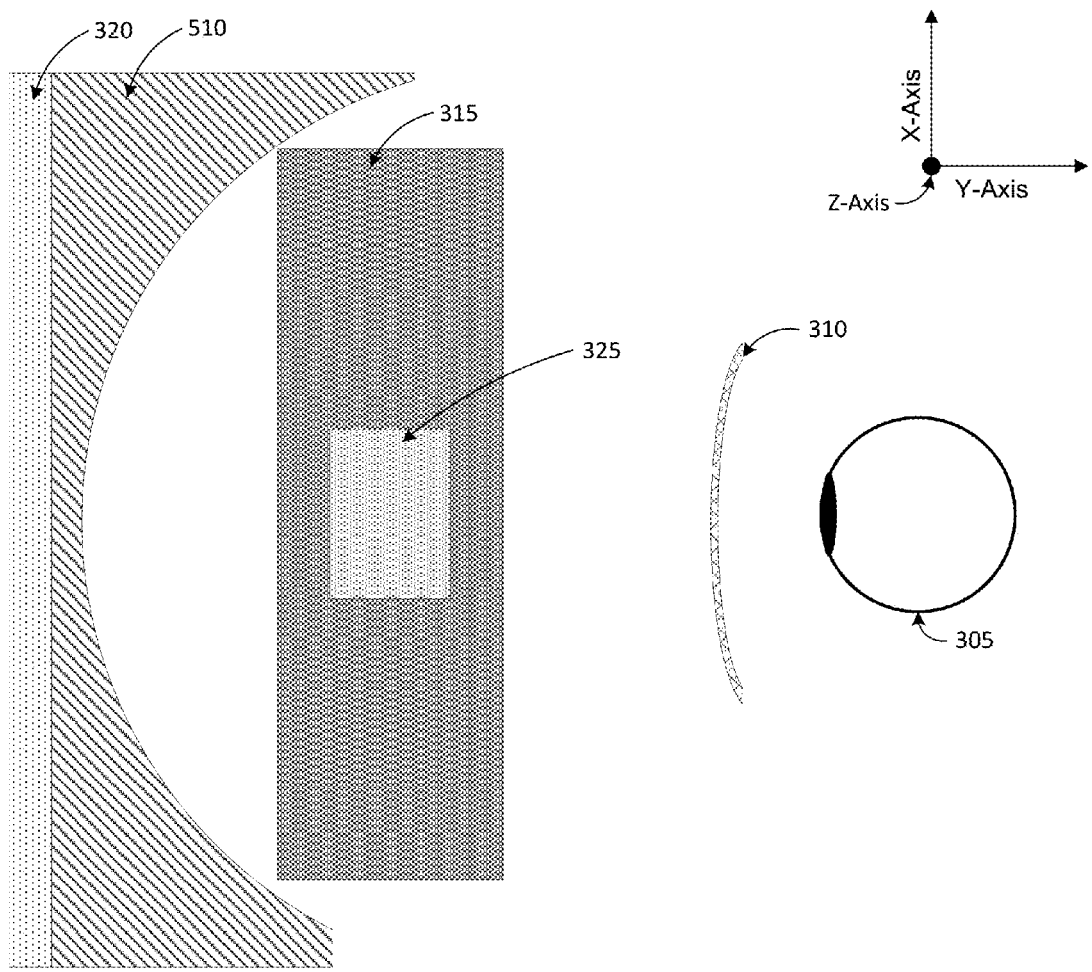
FIG. 6 illustrates a block diagram of a top view of the two display HMD of FIGS. 5A and 5B according to at least one example embodiment.

FIG. 6 illustrates a block diagram of a top view of the two-display HMD of FIGS. 5A and 5B according to at least one example embodiment. Like elements are represented by like reference numerals, which are described above and may not be described further with regard to this figure. As shown in FIG. 6, the first display 320 is a flat surface or flat panel display and the faceplate 510 is formed as an arc or curved surface. The aforementioned image distortions and image aberrations can cause eye fatigue. Therefore, using a curved faceplate 510 in contact with the first display 320 (e.g., the low or medium resolution display) can reduce or minimize the image distortions. Therefore, using the faceplate in addition to the lens 310 can improve the image displayed by the first display 320. As a result, using a curved faceplate 510 in contact with the first display 320 can reduce eye fatigue which can improve a user experience.

Figure 7A:
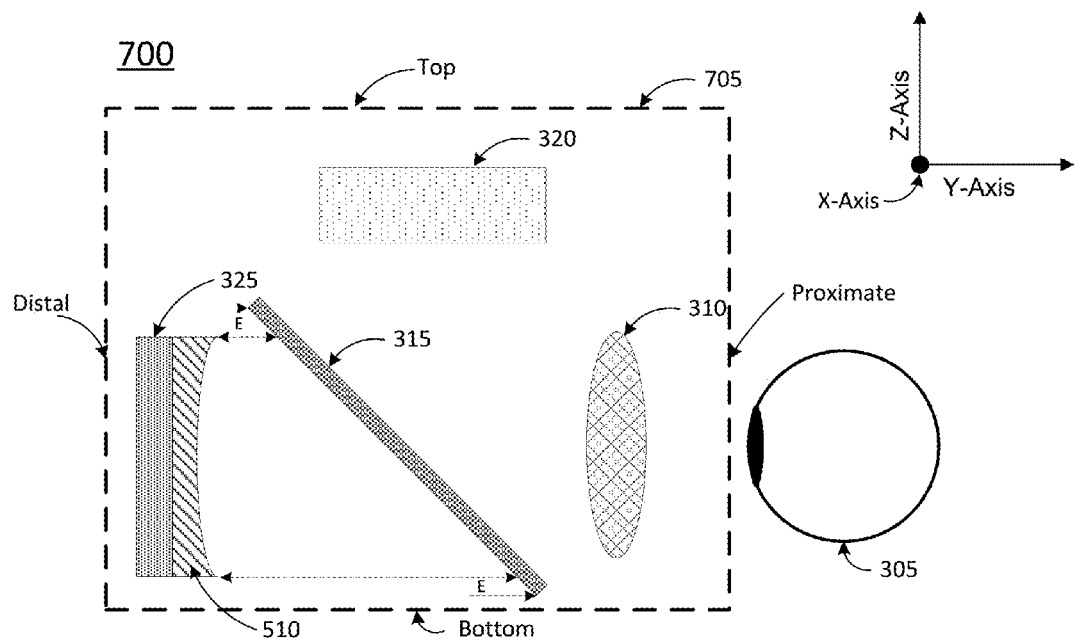
FIGS. 7A and 7B illustrate a block diagram of a side view of still another two display HMD according to at least one example embodiment.

Further, as shown in FIG. 7A, in an example implementation, the image combiner 315 can extend beyond the position of the second display 325 as another mechanism to minimize visibility of its edges (illustrated as length E). In other words, extended (in length) image combiner 315 (illustrated as length E) can provide a transition between an image projected by the first display 320 and an image projected by the second display 325. The faceplate 510 can also be a tapered faceplate as is known in the art. A tapered fiber optic faceplate used as an expander has a larger area at the exit face than at the input face. Thus the tapered faceplate may be configured to expand an image to a larger area. Accordingly, the tapered faceplate may enable use of a smaller first display 320 (e.g., a smaller, and potentially less costly, display). The use of tapered faceplate can be used to effect a change in the size of an emissive display.

Figure 7B:
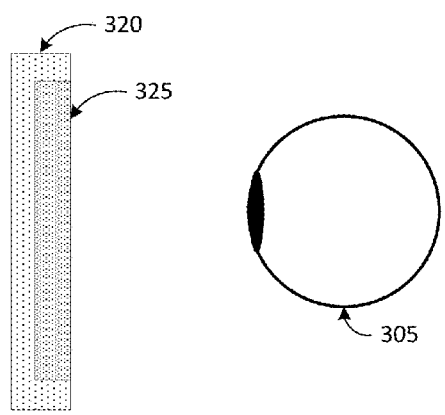
Figure 7C:
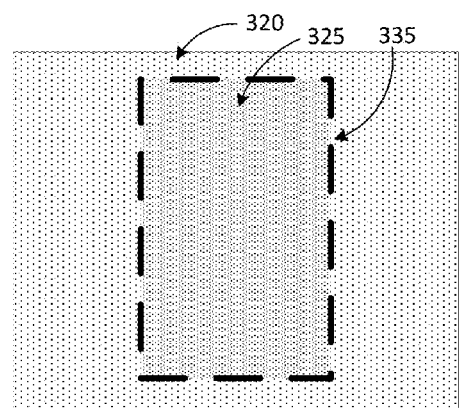
FIG. 7C illustrates a block diagram of a front view of a two display HMD of FIGS. 7A and 7B according to at least one example embodiment.

FIGS. 7A and 7B illustrate a schematic diagram of a side view cross section of still another two display HMD 700 according to at least one example embodiment. Like elements are represented by like reference numerals, which are described above and may not be described further with regard to this figure. As shown in FIGS. 7A and 7B, a combined display system 705 includes the lens 310, the image combiner 315, the first display 320, the second display 325 and the faceplate 510. An eye 305 (one is shown, but it is understood that the HMD includes a matching system for the other eye) visually perceives the combined display system 705 as a single display including the first display 320 and the second display 325 as shown in FIG. 7B. The operation of the combined display system 705 is substantially similar to the combined display system 330 with the exception that the positions of the first display 320 and the second display 325 have been exchanged or transposed.

Accordingly, in the example implementation shown in FIG. 7A, the image combiner 315 can be configured to reflect an image projected from the first display 320 toward the lens 310. Further, the image combiner 315 may be configured to allow an image projected from the second display 325 to pass through the image combiner 315 toward the lens 310. In the example implementation shown in FIG. 7A the second display 325 (as the high resolution display) is viewed directly through the image combiner 315 and not by reflection from the image combiner 315. The lower resolution display 320 is viewed by reflection from image combiner 315. As a result, imperfections in the reflective qualities of image combiner 315 affect the lower resolution display 320 and interfere with resolution to a lesser degree than in embodiments in which the high resolution display is viewed by reflection. Further, the first display 320 (e.g., the low or medium resolution display) can be more flexible in its configuration. For example, the first display 320 can be a flat display, a curved display and/or a combination of a flat and curved display.

In the example implementation shown in FIG. 7A, the image combiner may be configured to absorb or not reflect a portion of the image projected by the first display 320. The portion of the image that is not reflected corresponds to the image projected by the second display 325. Alternatively, or in addition to, the first display 320 may be configured to (e.g. controlled to) reduce an intensity (i.e., brightness or luminosity) of a portion of a projected image corresponding to a position of the second display 325. Accordingly, a portion of the image projected by the first display 320 may not reflect off the image combiner 315 because the portion of the projected image corresponding to the position of the second display 325 is not bright enough or is not as bright as the image projected by the second display 325.

Figure 8:
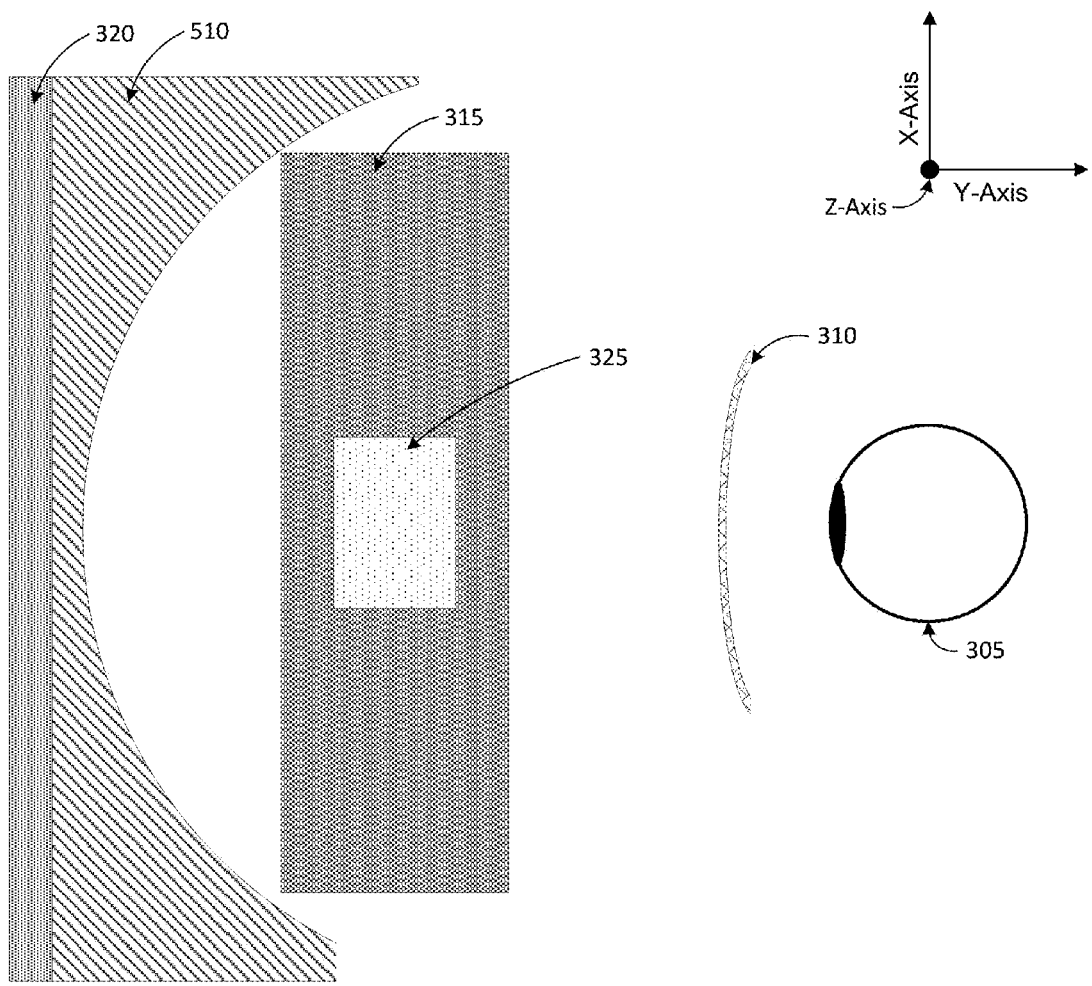
FIGS. 8, 9 and 10 illustrate block diagrams of a top view of alternate configurations of the two display HMD of FIGS. 7A and 7B according to at least one example embodiment.
Figure 9:
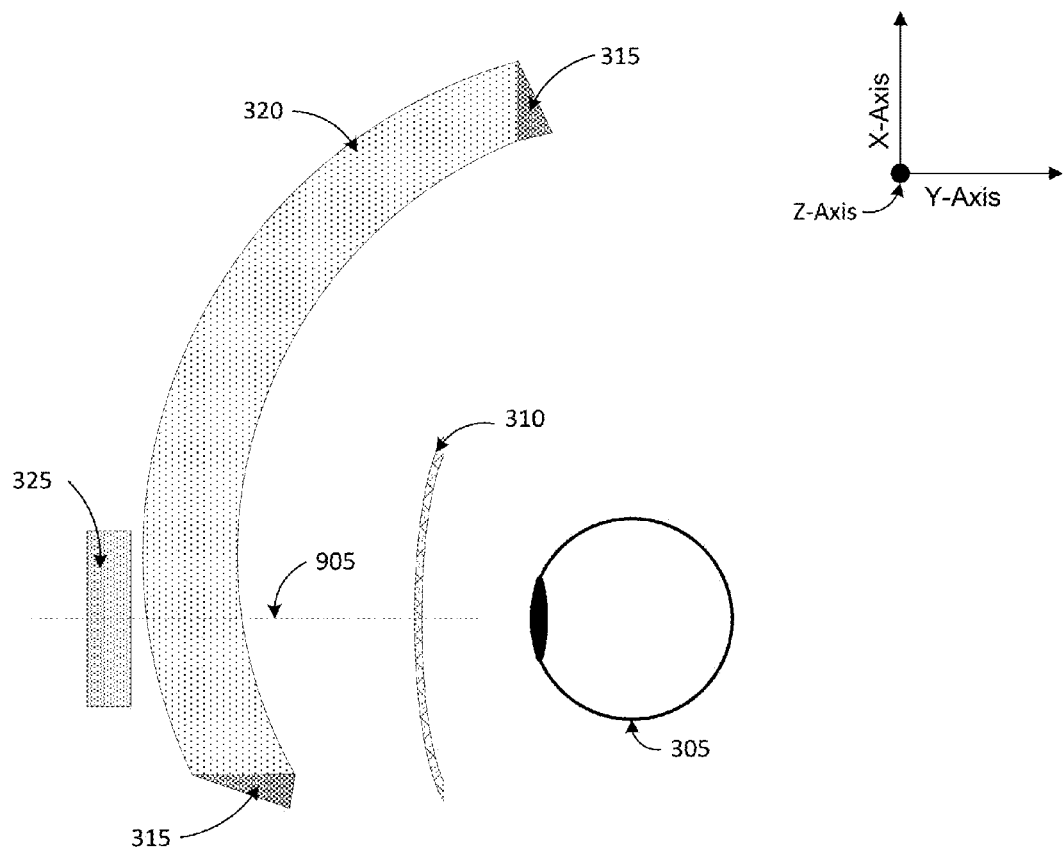
Figure 10:
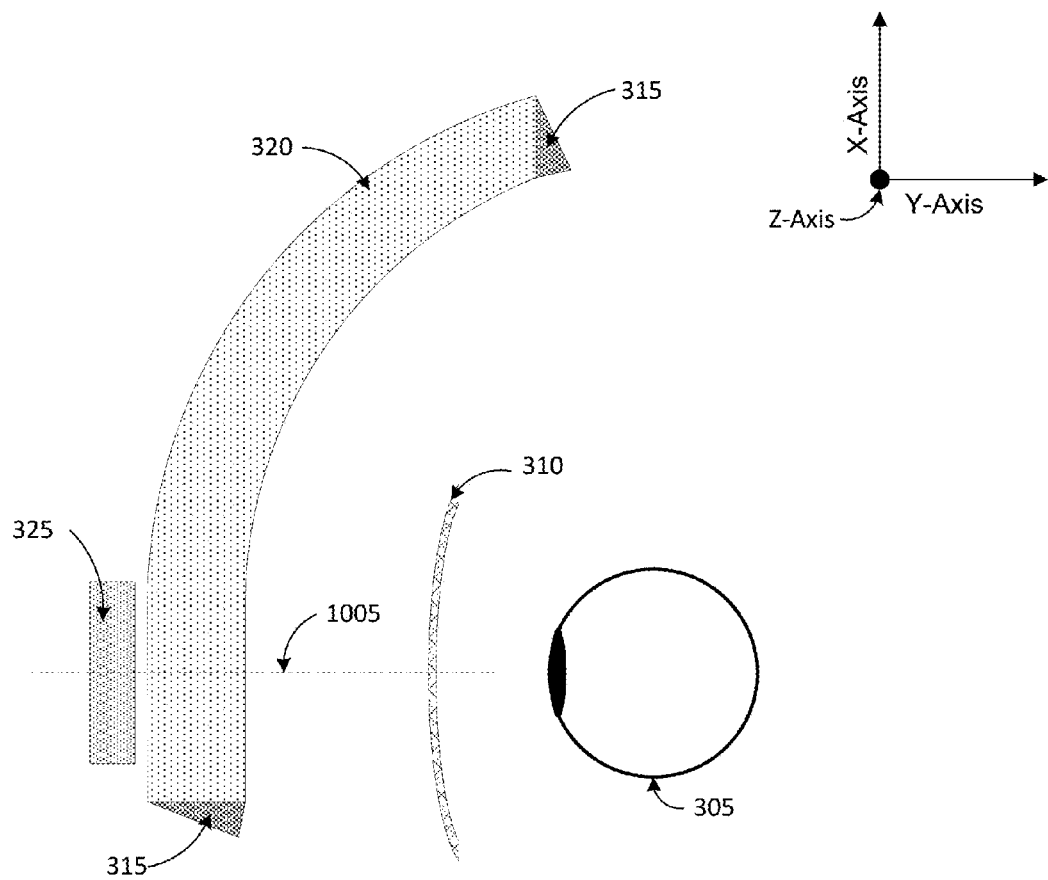

FIGS. 8, 9 and 10 illustrate schematic diagrams of a top view of alternate configurations of the two display HMD of FIGS. 7A and 7B according to at least one example embodiment. Like elements are represented by like reference numerals, which are described above and may not be described further with regard to this figure. As shown in FIG. 8, the second display 325 is a flat surface or flat panel display and the faceplate 510 is formed as an arc or curved surface. Using a curved faceplate 510 in contact with the second display 325 (e.g., the high resolution display) can reduce or minimize the image distortions and image aberrations. Therefore, using the faceplate in addition to the lens 310 (or as an alternative to using the lens 310) can improve the image displayed by the second display 325.

Further, as shown in FIG. 7A, in an example implementation, the image combiner 315 can extend beyond the position of the first display 320 as another mechanism to minimize visibility of its edges. In other words, extended (in length) image combiner 315 can provide a transition between an image projected by the first display 320 and an image projected by the second display 325. The faceplate 510 can also be a tapered faceplate. The tapered faceplate may be configured to expand an image to a larger area. Accordingly, the tapered faceplate may enable use of a smaller (e.g., dimensionally or as smaller surface area) second display 325 (e.g., a smaller, and potentially less costly, display). The use of tapered faceplate can be used to effect a change in the size of an emissive display.

As shown in FIG. 9, the first display 320 (e.g., the low or medium resolution display) is shown as an arc over the entire length of the display. In addition, the image combiner 315 mimics the shape of the first display 320. In other words, the image combiner 315 is under the first display 320 (and, therefore, its full length is not shown). Using a curved display as the first display 320 in addition to the lens 310 (or as an alternative to using the lens 310) can improve the image displayed at the temporal ends of the first display 320. A side view of FIG. 9 viewed at dotted line 905 (e.g., a slice) could be illustrated as the combined display system 705 as shown in FIG. 7A.

As shown in FIG. 10, the first display 320 (e.g., the low or medium resolution display) is shown as a flat panel over a length corresponding to the second display 325 and an arc over a length of the display not corresponding to the second display 325. In addition, the image combiner 315 mimics the shape of the first display 320. In other words, the image combiner 315 is under the first display 320 (and, therefore, its full length is not shown). Using a curved display approaching the temporal ends of the first display 320 in addition to the lens 310 (or as an alternative to using the lens 310) can improve the image displayed at the temporal ends of the first display 320. Further, by including a flat section of the image combiner 315 can minimize some of the distortions of an image projected by the second display 325. A side view of FIG. 10 viewed at dotted line 1005 (e.g., a slice) could be illustrated as the combined display system 705 as shown in FIG. 7A. The image combiner 315 is shown in FIG. 10 in order to illustrate that the image combiner 315 is under the first display 320 (when the HMD is viewed from the top). The ends of the image combiner 315 are shown in the shape of a triangle, however, example embodiments are not limited thereto.

Figure 11:
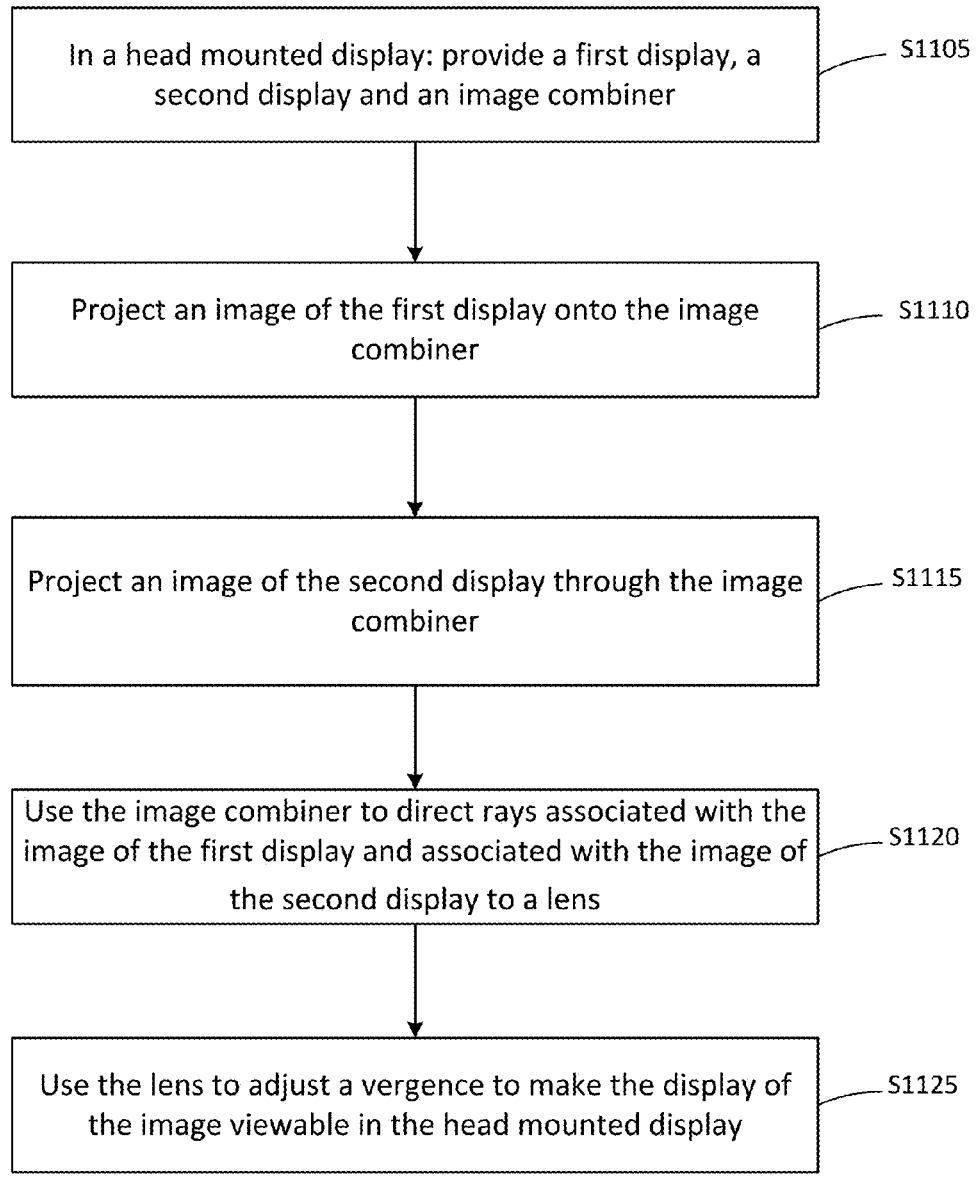
FIG. 11 illustrates method associated with a two display HMD according to at least one example embodiment.
Figure 12:
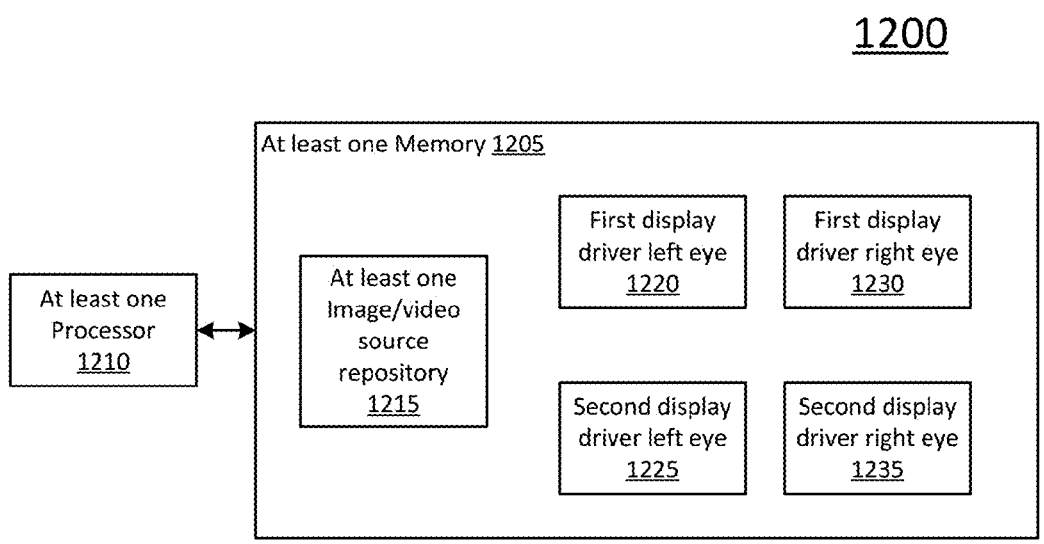
FIG. 12 illustrates a block diagram of a virtual reality VR system associated with a HMD according to at least one example embodiment.

FIG. 11 illustrates a method associated with a two-display HMD according to at least one example embodiment. At least one of the steps described with regard to FIG. 11 may be performed due to the execution of software code stored in a memory associated with an apparatus (e.g., as shown in FIG. 12) and executed by at least one processor associated with the apparatus. However, alternative embodiments are contemplated such as a system embodied as a special purpose processor. Although at least one of the steps described below are described as being executed by a processor, the steps are not necessarily executed by the same processor. In other words, at least one processor may execute at least one of the steps described below with regard to FIG. 11. Further, the steps described with regard to FIG. 11 refer to one view or eye (e.g., one of the displays viewed by human eyes). However, it is understood that a similar process is applied to the other view (e.g., the other of the displays viewed by human eyes).

As shown in FIG. 11, in step S1105 in a head mounted display, provide a first display, a second display and an image combiner. For example, as discussed above with regard to FIGS. 1, 3A, 3B, 4, 5A, 5B, 6, 7A, 7B and 8-10, a HMD can include a first display 320, a second display 325 and an image combiner 315.

In step S1110 project an image of the first display onto the image combiner. For example, in a first example implementation, the second display 325 (e.g., high resolution display) can be projected onto the image combiner 315. In a second example implementation, the first display 320 (e.g., low or medium resolution display) can be projected onto the image combiner 315.

In step S1115 project an image of the second display through the image combiner. For example, in the first example implementation, the first display 320 (e.g., low or medium resolution display) can be projected though the image combiner 315. In the second example implementation, the second display 325 (e.g., high resolution display) can be projected onto the image combiner 315.

In step S1120 use the image combiner to direct rays associated with the image of the first display and associated with the image of the second display to a lens. For example, the image combiner 315 can reflect the image projected on to it (e.g., toward the lens 320) causing a combination of this image with the image that is projected through the image combiner 315. In step S1125 use the lens to adjust a vergence to make the display of the image viewable in the head mounted display.

Example implementations of a VR system may include an image or video system configured to generate images or video (e.g., based on an image or video source) and a corresponding, at least one, display driver configured to control the display of the generated images or video on the first display 320 and the second display 325. The image or video system may be included in the HMD 300 and/or may be associated with an external computing device. In some implementations, the display driver may be included in the HMD 300 and the images or video may be generated in the external computing device. Further, in some implementations, the display driver may be included in the external computing device and the images or video may be generated in the external computing device.

Figure 13:
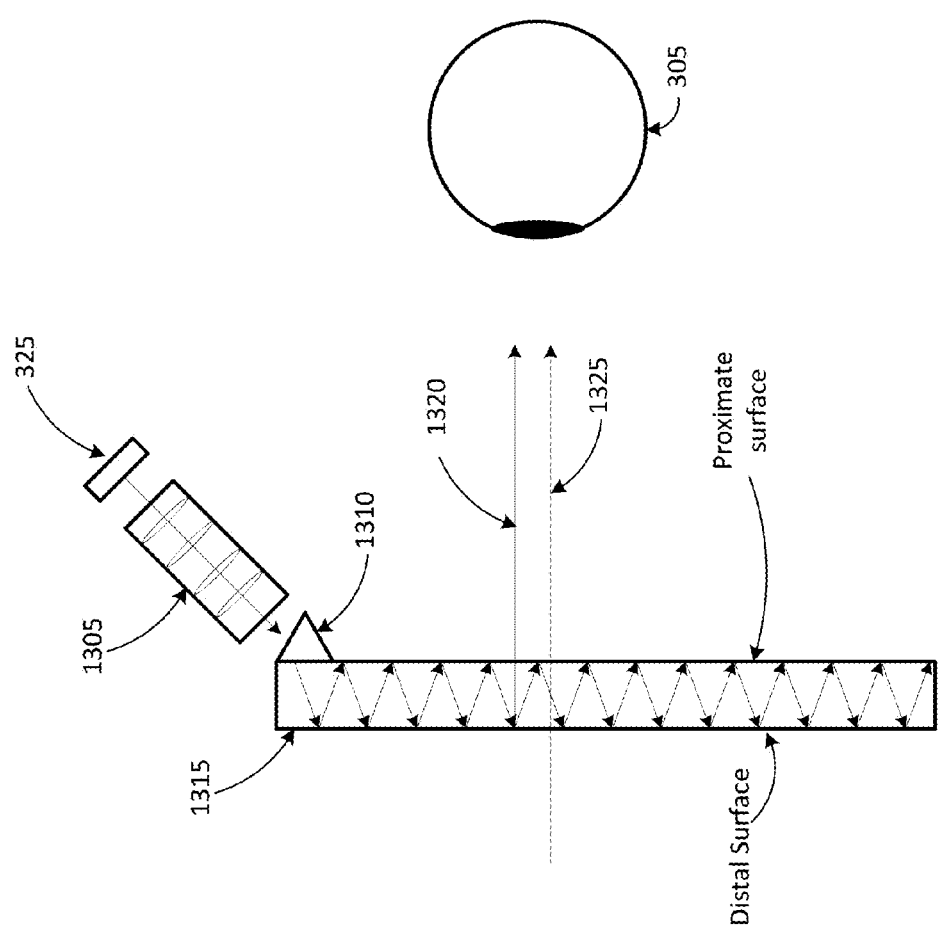
FIG. 13 illustrates a technique that uses a light guide to relay images through a thin glass or plastic plate to create an augmented reality display system according to at least one example embodiment.

FIG. 13 illustrates a technique that uses a light guide 1315 to relay images through a thin glass or plastic plate (e.g., a thin glass or plastic plate) to create an augmented reality display system. The image is generated by a high resolution display 325 and a collimator 1305 is used to inject the corresponding light rays into the light guide 1315 through a prism 1310. The rays can propagate by internal reflection (e.g., total internal reflection) through the light guide 1315 until reaching a semitransparent reflector which allows some of the rays to intersect the interior surface of the light guide (e.g., at angles less than the critical angle for total internal reflection). Such rays indicated by 1320 then exit the light guide 1315 and are seen by the eye 305. There are also techniques that can use holograms or diffraction gratings, combined with internal reflection (e.g., total internal reflection), to create a similar light guide optical system. The distal and proximate surfaces of the light guide 1315 can be transparent. Accordingly, ray 1325 represents rays from a second display (e.g., display 320), or alternatively, the ambient scene that propagate through the transparent light guide 1325 which are also seen by the eye 305.

Figure 14:
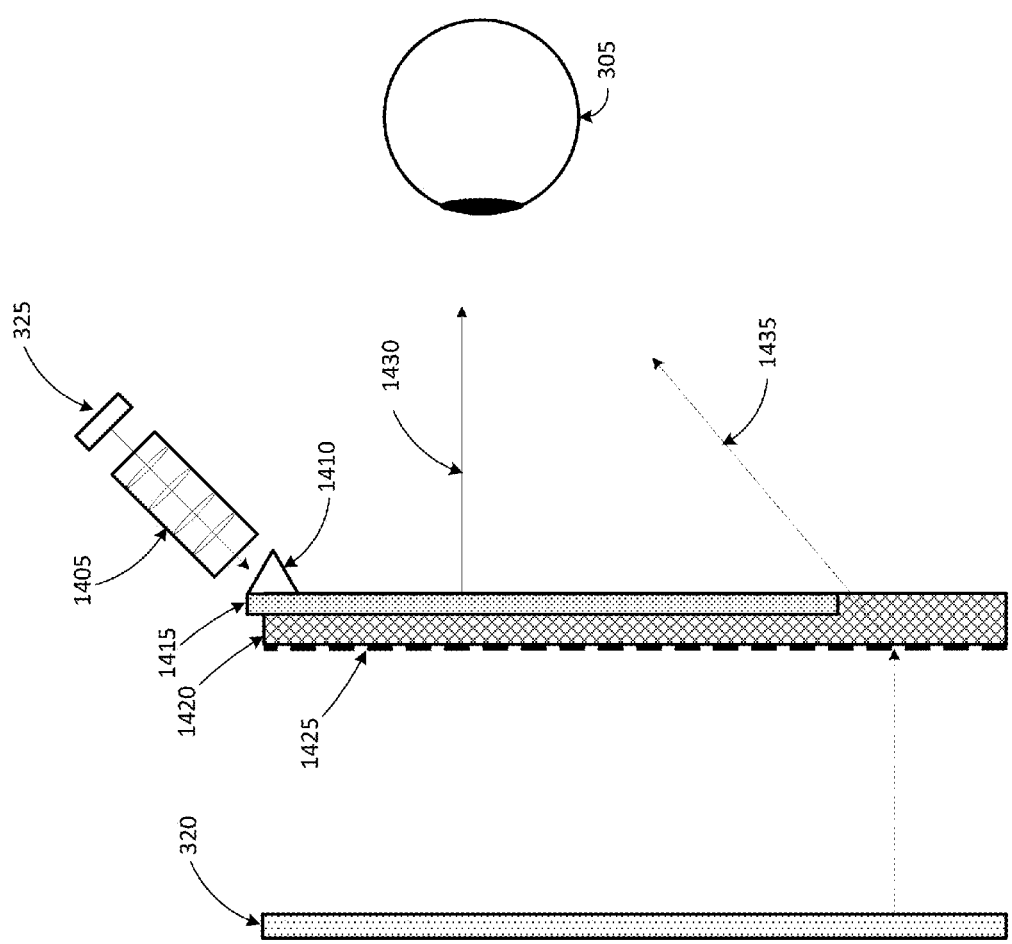
FIG. 14 illustrates a cross sectional view of another embodiment of an optical system in which two displays are used per eye to create an image of high resolution in the central field, and reduced resolution in the fields peripheral the central field according to at least one example embodiment.

FIG. 14 illustrates a cross sectional view of another embodiment of an optical system in which two displays are used per eye to create an image of high resolution in the central field, and reduced resolution in the fields peripheral the central field. A light guide 1415 is furnished with a metallic optical coating on the distal surface obviating the need for total internal reflection, but also making the system less suited to augmented reality because propagation of ray 1435 in FIG. 14 can be impeded. Light guide 1415 is bonded to Fresnel lens 1420 and may be bonded into a recess in Fresnel lens 1420 so that the Fresnel lens 1420 and light guide 1415 are integral, so that a smooth interface is formed between the distal surface of the light guide and the Fresnel lens. A lower resolution image from display 320 passes through Fresnel lens 1420 so that the user is able to view the combined images from display 320 and display 325.

As shown in FIG. 14, a high resolution image is created by display 325 and light rays from display 325 propagate into collimator 1405. Collimated rays propagate from the collimator 1405 to an injection prism 1410, are then relayed through the light guide 1415 and exit toward the eye 305 as represented by ray 1430 which is the chief ray from the center of display 325. The image thus formed is a high resolution image in the field of view of the user.

Figure 15:
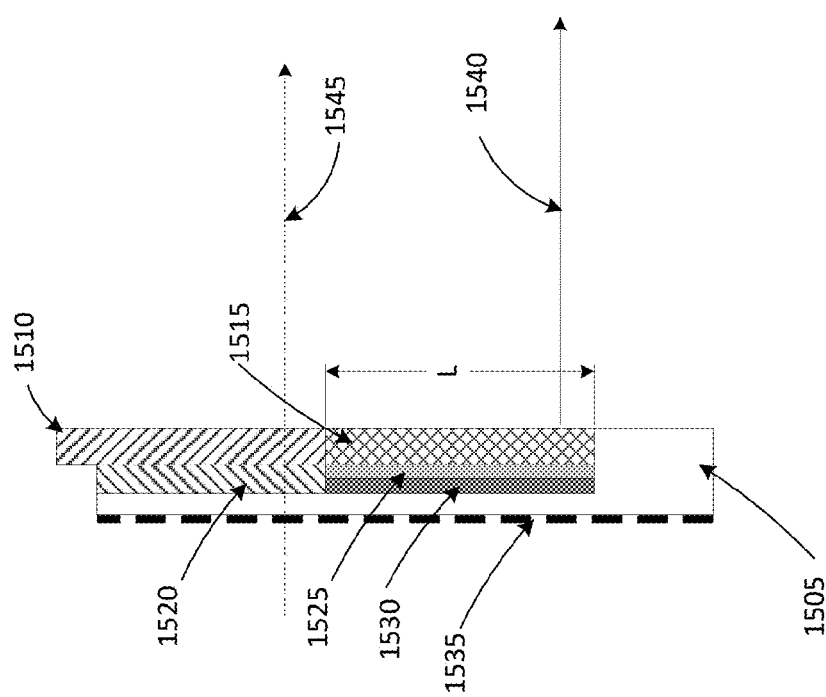
FIG. 15 illustrates an internal reflection to make a portion of the light guide transparent according to at least one example embodiment.
Figure 16:
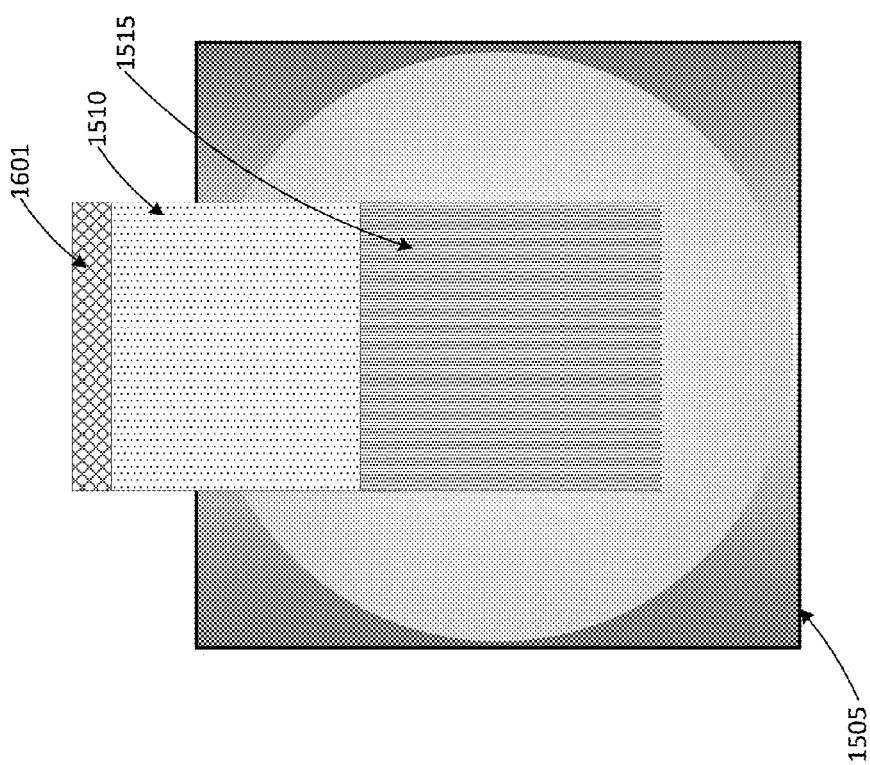
FIG. 16 illustrates a plan view of a Fresnel lens and a light guide according to at least one example embodiment.

Another implementation can be made by using total internal reflection to make a portion of the light guide transparent. This is shown in FIG. 15. In this example, the light guide 1510 is coated with a metallic film 1525 and bonded by glue 1530 within a cavity in Fresnel lens 1505. The glue 1530 and metal film 1525 can be thin (about 10 microns) so that the light guide 1510 and Fresnel lens 1505 are disposed in close proximity. The metal film 1525 defines a light output area L from which rays 1540 from the high resolution display 325 emerge. The thickness of the glue 1530 and metal film 1525 can form a gap 1520 meaning that light may propagate by total internal reflection through the upper light guide, and that the light guide 1510 remains transparent. Light from medium resolution panoramic display 320 propagates to the Fresnel lens 1505 (represented as ray 1545) and the eye 305 sees a combined image from the Fresnel lens 1505 and the light guide 1510. FIG. 16 shows a plan view of the Fresnel lens 1505 and the light guide 1510. Light from the high resolution display 325 enters the light guide through entrance 1601 and is seen in region 1515 of the light guide 1510 and light from the medium resolution display 320 is seen elsewhere.

FIG. 12 illustrates a block diagram of a virtual reality VR system 1200 associated with a HMD according to at least one example embodiment. As shown in FIG. 12, the VR system 1200 includes at least one memory 1205 and at least one processor 1210. The at least one memory 1205 may be included in the HMD (e.g., HMD 300), an external (e.g., external to the HMD) computing device (e.g., a personal computer or a hand held device) and/or included in both the HMD and the external computing device.

The at least one memory includes at least one image/video source repository 1215, a first display driver left eye 1220, a second display driver left eye 1225, a first display driver right eye 1230, a second display driver right eye 1235. These elements may be included in the at least one memory 1205 of the HMD (e.g., HMD 300), in the at least one memory 1205 of an external (e.g., external to the HMD) computing device (e.g., a personal computer or a hand held device) and/or included in the at least one memory 1205 of both the HMD and the external computing device. For example, the at least one image/video source repository 1215 may be included in the external device, whereas the other elements are included in the HMD. Further, a left eye driver may include the first display driver left eye 1220 and the second display driver left eye 1225; and a right eye driver may include the first display driver right eye 1230 and the second display driver right eye 1235.

The at least one processor 1210 (e.g., a processor formed on a silicon substrate, a GaAs substrate, and the like) may be utilized to execute instructions stored on the at least one memory 1205 (e.g., a non-transitory computer readable medium), so as to thereby implement the various features and functions described herein, or additional or alternative features and functions. The at least one processor 1210 and the at least one memory 1205 may be utilized for various other purposes. For example, the at least one memory 1205 may be understood to represent an example of various types of memory and related hardware and software which might be used to implement any one of the modules described herein. Systems and/or methods described herein may include data and/or storage elements. The data and/or storage elements (e.g., data base tables) may be stored in, for example, the at least one memory 1205.

The at least one image/video source repository 1215 may store images and videos for display on the HMD. (e.g., on the first display 320 and the second display 325). The at least one image/video source repository 1215 may store images and video corresponding to right eye and left eye (e.g., at different visual perspectives) images and video that can be utilized to generate a three dimensional (3D) image or video. The at least one image/video source repository 1215 may store raw (e.g., unformatted) or encoded images and video. Accordingly, the VR system 1200 may include (or have access to) a mechanism (e.g., algorithms) to format and/or decode the images and videos.

The display drivers, the first display driver left eye 1220, the second display driver left eye 1225, the first display driver right eye 1230, the second display driver right eye 1235, may be configured to control the display of an image or video on a corresponding display (e.g., the first display 320 or the second display 325). The display drivers may be configured to use an image or video as input data and communicate signals representing color based on the input image or video to the corresponding display. The signals representing color may be, for example, correspond to a RGB or YUV format.

The presence of a pixel density may not dictate that the high resolution display should be operated at high resolution. By combining data on neighboring pixels, the resolution can be blended so that the resolution does not change abruptly at the boundaries of the image of high resolution display. It is also possible to adjust luminance and contrast so that edges are not obvious, so that as the high resolution display fades out, the low resolution display fades in.

Therefore, the display drivers may operate together to control the first display 320 and the second display 325 such that the first display 320 and the second display 325 are controlled to provide a transition (in addition to and/or as an alternative to the configuration of the image combiner 315) between an image projected by the first display 320 and an image projected by the second display 325. For example, the first display 320 can be configured to project a progressively darker image (which should not pass through the image combiner 315) from pixels of the first display 320 along the boundary of the image combiner 315 between the first display 320 and the second display 325 until there is a dark (or no light or black) image at the center of the first display 320 corresponding to the center of the image combiner 315. Further, the second display 325 can be configured to project a progressively darker image (which should not reflect on the image combiner 315) from pixels of the second display 325 at some threshold distance in from the boundary of the image combiner 315 between the first display 320 and the second display 325 toward the center of the second display 325 until there is a dark (or no light or black) image at an outer boundary of the second display 325.

Figure 17:
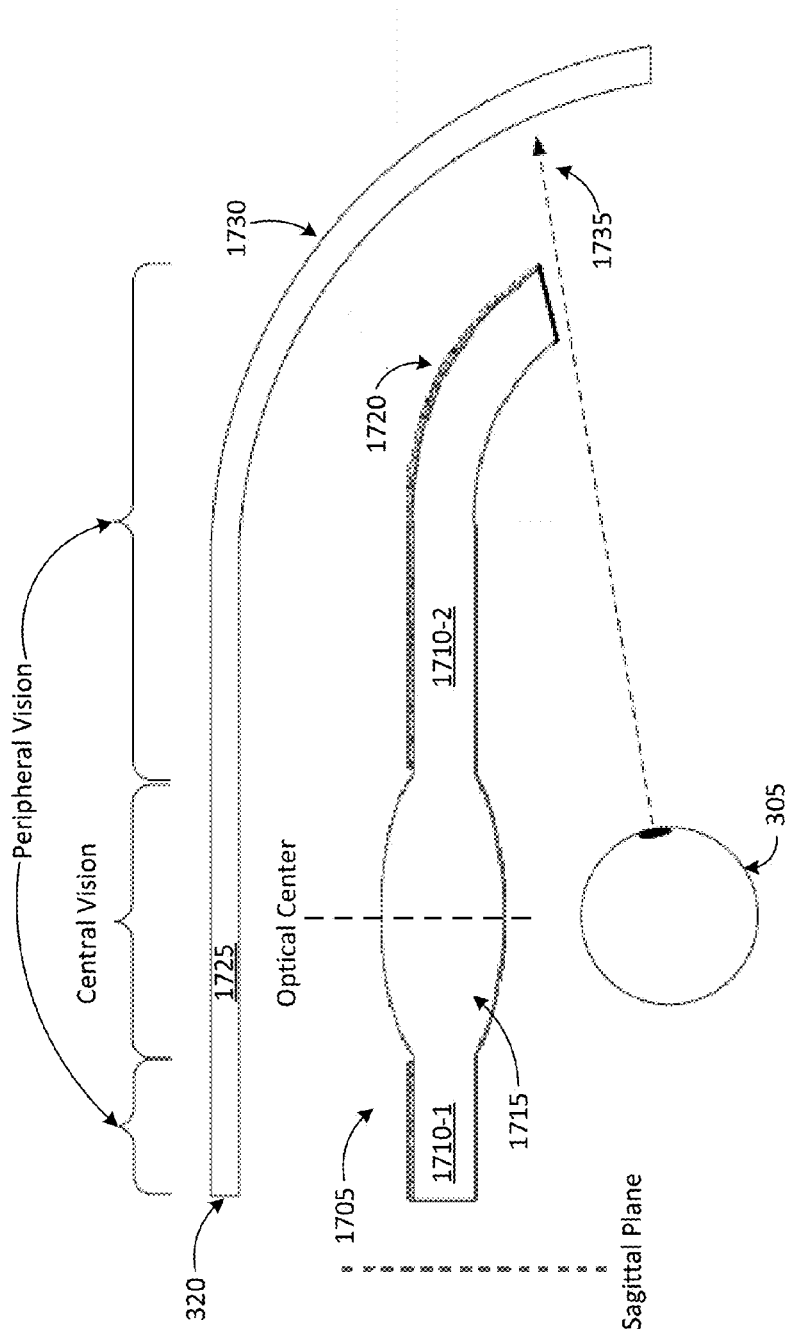
FIG. 17 illustrates a top view of a block diagram of a portion of a HMD including a hybrid lens system according to at least one example embodiment.

FIG. 17 illustrates a top view of a block diagram of a portion of a HMD including a hybrid lens system according to at least one example embodiment. An optical system intended for use over a high field of view can also be formed from a hybrid lens system 1705. One way to improve peripheral vision is to employ a curve near the temple as shown in FIG. 17. By curving Fresnel lens 1710-1, 1710-2, rays emitted for example by a curved section 1730 of display panel 320 may be collected by hybrid optical system 1705 and relayed to the eye 305. In FIG. 17, the eye 305 is turned to a high angle, but peripheral rays may be seen by the retina in peripheral vision without eye rotation, provided the display and lens produce rays that produce a virtual image in the periphery. Although a curve on one axis is shown, Fresnel lens 1710-1, 1710-2 may be curved along multiple axes. In an example implementation, Fresnel lens 1710-1, 1710-2 can be formed upon a curved substrate that bends in one or more axes. In the illustrated implementation, Fresnel lens 1710-1, 1710-2 is planar (shown as portion 1710-1) on the nasal side of a central vision lens 1715 but curved along a portion 1710-2 on the temple side of the central vision lens 1715.

The hybrid lens system 1705 can include a singlet lens 1715 (e.g., spherical or aspherical lens) formed at the optical center of the Fresnel lens 1710-1, 1710-2 (e.g., as an aspherical Fresnel lens). In other words, the optical center of singlet lens 1715 can be co-incident with the optical center of Fresnel lens 1710-1, 1710-2. In the illustrated implementation, the optical centers of the lenses are placed in front of the user's pupil/cornea (when the eye is gazing straight ahead). In the illustrated implementation, the singlet lens 1715 (e.g., as a central vision lens) can be implemented as a refractive lens having two curved surfaces. However, a refractive lens having only a single curved surface may also be utilized. Furthermore, the singlet lens 1715 may be implemented as a progressive lens, an achromatic lens, a diffractive optical element, a hologram, or even a hybrid refractive-diffractive lens.

The display 320 can include a flat section 1725 and curved section 1730 that extends beyond the curved section 1720 of hybrid lens system 1705 so that display 320 may be viewed directly without any lens (as illustrated by arrow 1735), or through clear plastic. In such an embodiment, display 320 can be extended to a peripheral region of the FOV where the eye has little peripheral resolution such that merely motion and awareness of light can be perceived. In this peripheral region (outside of lens 1705) no lensing may be necessary. This is analogous to the image presented by prescription eyewear when looking beyond the outer edge of the lens. In such a case the peripheral image is out of focus, which may not detract from a feeling of presence.

Figure 18:
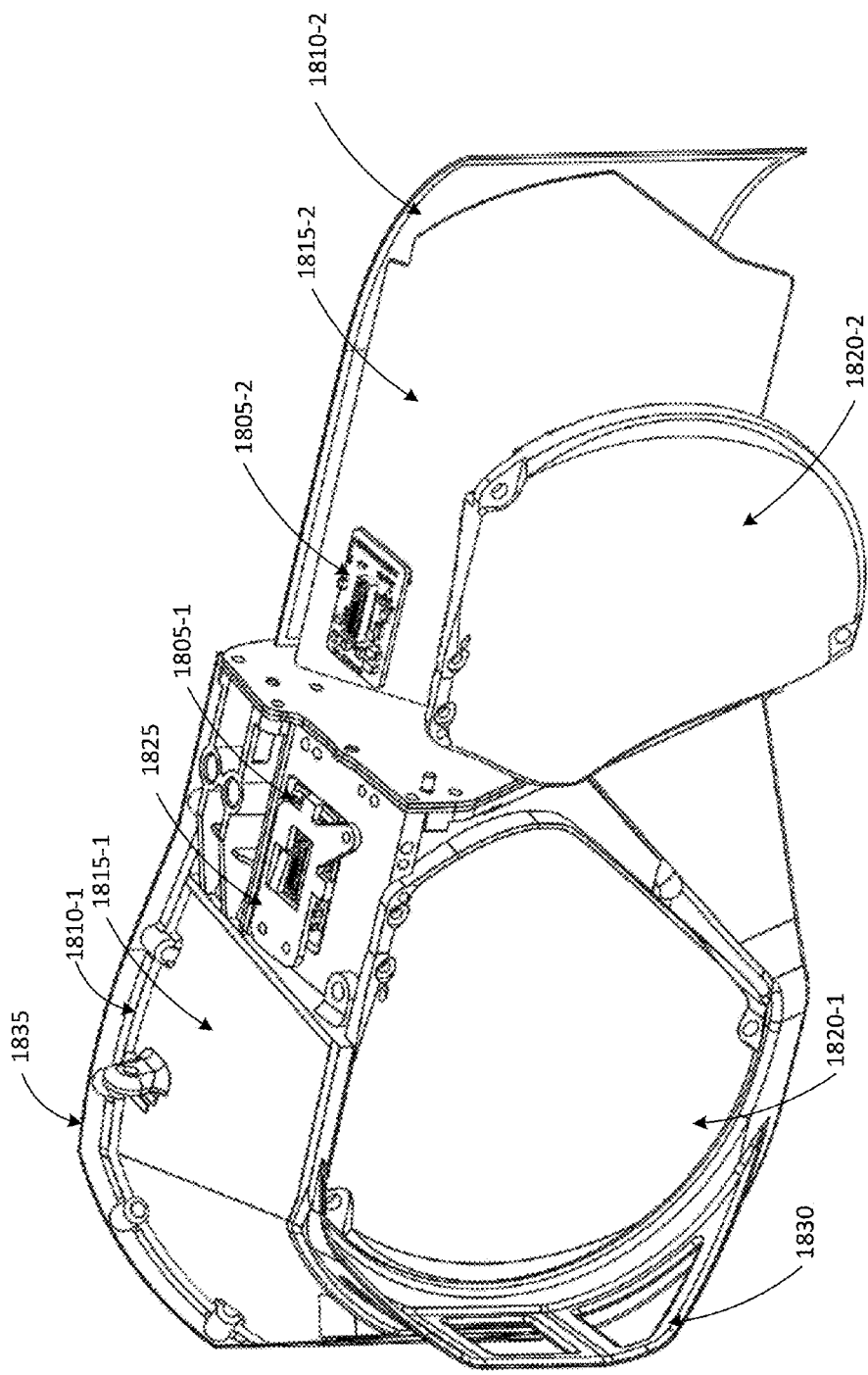
FIGS. 18 and 19 illustrate views of a line diagram of a HMD according to at least one example embodiment.
Figure 19:
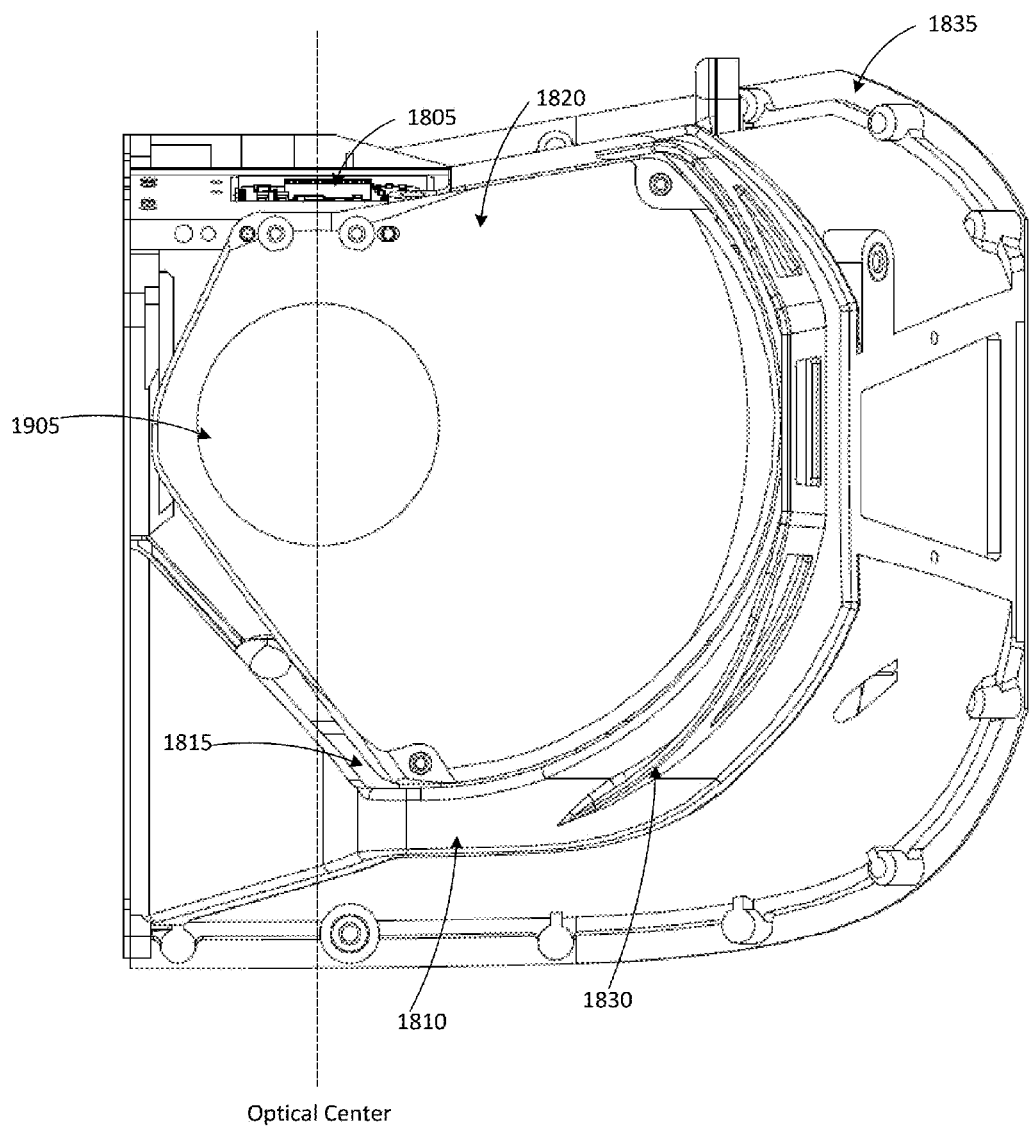

FIGS. 18 and 19 illustrate views of a line diagram of a HMD according to at least one example embodiment. As shown in FIG. 18, the HMD includes a first display 1805-1, 1805-2 (or display portion) and a second display 1810-1, 1810-2 (or display portion). The first display 1805-1, 1805-2 can have a higher pixel density than the second display 1810-1, 1810-2. Although the implementation illustrated in FIGS. 18 and 19 is shown as two displays, the first display 1805-1, 1805-2 can be a single display with two portions or the first display 1805-1, 1805-2 can be two separate displays. The second display 1810-1, 1810-2 can be a single display, a single display with two or more portions and/or two or more displays. The second display 1810-1, 1810-2 can include at least one curved portion.

The HMD can include at least one image combiner 1815-1, 1815-2 configured to combine two images. For example the at least one image combiner 1815-1, 1815-2 can reflect an image projected by the first display 1805-1, 1805-2 and allow an image projected by the second display 1810-1, 1810-2 to pass through the at least one image combiner 1815-1, 1815-2.

The HMD can include at least one lens 1820-1, 1820-2. The at least one lens 1820-1, 1820-2 can be a hybrid lens system (e.g., hybrid lens system 1705). Therefore, the at least one lens 1820-1, 1820-2 can include a singlet lens 1905 shown in FIG. 19. The HMD can include an enclosure 1835 configured to enclose the elements (e.g., first display 1805-1, 1805-2) of the HMD. The HMD can include a frame (not shown) to which elements of the HMD may be disposed on and/or fastened to. For example, the frame and a bracket 1825 together may fasten the first display 1805-1 in a position within the HMD.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. Various implementations of the systems and techniques described here can be realized as and/or generally be referred to herein as a circuit, a module, a block, or a system that can combine software and hardware aspects. For example, a module may include the functions/acts/computer program instructions executing on a processor (e.g., a processor formed on a silicon substrate, a GaAs substrate, and the like) or some other programmable data processing apparatus.

Some of the above example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments. Example embodiments, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative embodiments, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of non-transitory program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or embodiments herein disclosed irrespective of whether or not that particular combination has been specifically enumerated in the accompanying claims at this time.

What is claimed is:

1. A head mounted display (HMD) comprising:
    a first display portion included in the HMD, the first display portion having a first pixel density;
    a second display portion included in the HMD, the second display portion having the first pixel density;
    a third display portion attached to the HMD, the third display portion having a second pixel density; and
    at least one image combiner configured to optically combine two images by reflecting light rays representing an image projected by the first display portion and the second display portion and allowing light rays representing an image projected by the third display portion to pass through the at least one image combiner, the at least one image combiner including a region configured as a transition between the image projected by the first display portion and the second display portion and the image projected by the third display portion.

2. The HMD of claim 1, wherein the at least one image combiner is further configured to block light rays representing a portion of the image projected by the third display portion, the light rays representing portion of the image projected by the third display portion corresponding to the light rays representing the image projected by the first display portion and the second display portion.

3. The HMD of claim 1, wherein the at least one image combiner is further configured to block light rays representing a portion of the image projected by the first display portion and the second display portion, the light rays representing the portion of the image projected by the first display portion and the second display portion corresponding to the light rays representing the image projected by the third display portion.

4. The HMD of claim 1, wherein
the first pixel density is a higher pixel density than the second pixel density, and
the third display portion is configured to reduce a brightness of a portion of the image projected by the third display portion, the portion of the image projected with reduced brightness by the third display portion corresponding to the image projected by the first display portion and the second display portion.

5. The HMD of claim 1, wherein
the first pixel density is a lower pixel density than the second pixel density, and
the first display portion and the second display portion are configured to reduce a brightness of a portion of the image projected by the first display portion and the second display portion, the portion of the image projected with reduced brightness by the first display portion and the second display portion corresponding to the image projected by the third display portion.

6. The HMD of claim 1, wherein the two images are blended at a boundary between the two images.

7. The HMD of claim 1, wherein the HMD is communicatively coupled to a computing device configured to generate the two images using an optical fiber.

8. The HMD of claim 1, wherein
the first pixel density is a higher pixel density than the second pixel density, and
the first display portion and the second display portion are positioned above the third display portion.

9. The HMD of claim 1, wherein at least one of the first display portion, the second display portion and the third display portion include a curved portion.

10. The HMD of claim 1, further comprising at least one lens.

11. The HMD of claim 1, further comprising at least one of a motion sensor and an eye tracking component each configured to detect a change in a view position of a user of the HMD.

12. A head mounted display (HMD) of a virtual reality (VR) system, the HMD comprising:
a first combined display system configured to receive a first image, the first combined display system including:
a first display portion configured to project a first portion of the first image,
a second display portion configured to project a second portion of the first image, and
an image combiner configured to optically combine two images by reflecting light rays representing the first portion of the first image and allowing light rays representing the second portion of the first image to pass through the image combiner, the image combiner including a region configured as a transition between the first portion of the first image and the second portion of the first image; and
a second combined display system configured to receive a second image, the second image being a different view perspective of the first image, the second combined display system including:
a third display portion configured to project a first portion of the second image,
a fourth display portion configured to project a second portion of the second image, and
an image combiner configured to optically combine two images by reflecting light rays representing the first portion of the second image and allowing light rays representing the second portion of the second image to pass through the image combiner, the image combiner including a region configured as a transition between the first portion of the second image and the second portion of the second image.

13. The HMD of claim 12, wherein the HMD is communicatively coupled to a computing device associated with an image repository via an optical fiber.

14. The HMD of claim 12, wherein
the first display portion and the second display portion have a first pixel density,
the third display portion and the fourth display portion have a second pixel density, the second pixel density being lower than the first pixel density, and
the third display portion and the fourth display portion include a curved portion.

15. The HMD of claim 12, wherein
the first display portion and the second display portion have a first pixel density,
the third display portion and the fourth display portion have a second pixel density, the second pixel density being lower than the first pixel density, and
the first display portion and the second display portion are positioned above the third display portion and the fourth display portion.

16. The HMD of claim 12, further comprising at least one lens.

17. The HMD of claim 12, wherein the two images are blended at a boundary between the two images.

18. The HMD of claim 12, wherein
the first display portion is configured to reduce a brightness of a portion of the first portion of the first image, and
the third display portion is configured to reduce a brightness of a portion of the first portion of the second image.

19. The HMD of claim 12, wherein
the second display portion is configured to reduce a brightness of a portion of the second portion of the first image, and
the fourth display portion is configured to reduce a brightness of a portion of the second portion of the second image.

* * * * *